(12) United States Patent
Hallak et al.

(10) Patent No.: US 12,671,819 B2
(45) Date of Patent: Jun. 30, 2026

(54) CONTENT-BASED VIDEO COMPRESSION USING REINFORCEMENT LEARNING FOR VIDEO RATE CONTROL

(71) Applicant: NVIDIA Corporation, Santa Clara, CA (US)

(72) Inventors: Assaf Joseph Hallak, Tel Aviv (IL); Uri Haim Gadot, Tel Aviv (IL); Assaf Shoher, Rehovot (IL); Dotan Levi, Kiryat Motzkin (IL); Eshed Ram, Nofit (IL); Dror Porat, Haifa (IL); Eyal Frishman, Hod Hasharon (IL); Shie Mannor, Haifa (IL); Gal Chechik, Ramat Hasharon (IL)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 19/193,045

(22) Filed: Apr. 29, 2025

(65) Prior Publication Data

US 2026/0101045 A1 Apr. 9, 2026

Related U.S. Application Data

(60) Provisional application No. 63/702,980, filed on Oct. 3, 2024.

(51) Int. Cl.
*H04N 19/176* (2014.01)
*G06N 3/092* (2023.01)
(Continued)

(52) U.S. Cl.
CPC ........... *H04N 19/149* (2014.11); *G06N 3/092* (2023.01); *H04N 19/172* (2014.11); *H04N 19/176* (2014.11)

(58) Field of Classification Search
CPC .. H04N 19/149; H04N 19/172; H04N 19/176; G06N 3/092
(Continued)

(56) References Cited

U.S. PATENT DOCUMENTS 8,787,454 B1 7/2014 Chechik et al.
2018/0288420 A1* 10/2018 Yu ......................... H04N 19/172

OTHER PUBLICATIONS

Bjontegaard, G., "Calculation of average psnr differences between rd-curves," 2001.
(Continued)

*Primary Examiner* — Nguyen T Truong
(74) *Attorney, Agent, or Firm* — Leydig, Voit & Mayer, Ltd.

(57) ABSTRACT
A method for performing content-based video compression using reinforcement learning (RL) is provided. The method includes obtaining frame information associated with a frame from a video. The frame information comprises quantization parameter (QP) information associated with the frame, and the QP information indicates an initial compression level for encoding aspects of the frame. The frame information and additional information are processed by an RL agent to generate a generated QP map indicating a plurality of updated values associated with a plurality of macro-blocks (MBs) of the frame. A bitstream is generated comprising a plurality of bits for the frame based on the generated QP map. Specifically, the plurality of updated values from the generated QP map indicates an amount of allocated bits from the bitstream to allocate for each of the plurality of MBs. The bitstream is provided to a downstream model.

20 Claims, 11 Drawing Sheets

(51) Int. Cl.
  *H04N 19/149* (2014.01)
  *H04N 19/172* (2014.01)
(58) Field of Classification Search
  USPC ..................................................... 375/240.02
  See application file for complete search history.

(56) References Cited

OTHER PUBLICATIONS

Bross, B., et al., "Overview of the versatile video coding (vvc) standard and its applications," IEEE Transactions on Circuits and Systems for Video Technology, 31(10):3736-3764, 2021.

Cai, Q., et al., "A novel video coding strategy in hevc for object detection," IEEE Transactions on Circuits and Systems for Video Technology, 31(12):4924-4937, 2021.

Chen, L.C., et al., "Deeplab: Semantic image segmentation with deep convolutional nets, atrous convolution, and fully connected crfs," IEEE Transactions on Pattern Analysis and Machine Intelligence, 40(4):834-848, 2017.

Elgamal, T., et al., "Sieve: Semantically encoded video analytics on edge and cloud," In 2020 IEEE 40th International Conference on Distributed Computing Systems (ICDCS), pp. 1383-1388, IEEE, 2020.

Fischer, K., et al., "Video coding for machines with feature-based rate-distortion optimization," In 2020 IEEE 22nd International Workshop on Multimedia Signal Processing (MMSP), pp. 1-6, IEEE, 2020.

Galteri, L., et al., "Video compression for object detection algorithms," In 2018 24th International Conference on Pattern Recognition (ICPR), pp. 3007-3012, IEEE, 2018.

Garrett-Glaser, J., "A novel macroblock-tree algorithm for high-performance optimization of dependent video coding in h. 264/avc," Tech.Rep., 2009.

Ge, X., et al., "Task-aware encoder control for deep video compression," In Proceedings of the IEEE/CVF Conference on Computer Vision and Pattern Recognition, pp. 26036-26045, 2024.

Jocher, G., "Ultralytics/yolov5," https://github.com/ultralytics/ultralytics, Oct. 2020.

Kong, L., et al., "A new quality model for object detection using compressed videos," In 2016 IEEE International Conference on Image Processing (ICIP), pp. 3797-3801, IEEE, 2016.

Kufa, J., et al., "Software and hardware hevc encoding," In 2017 International Conference on Systems, Signals and Image Processing (IWSSIP), pp. 1-5, IEEE, 2017.

Li, P.H., et al., "Task-aware distributed source coding under dynamic bandwidth," Advances in Neural Information Processing Systems, 36, 2024.

Li, X., et al., "Task-driven semantic coding via reinforcement learning," IEEE Transactions on Image Processing, 30:6307-6320, 2021.

Liu, W., et al., "SSD: Single shot multibox detector," In Computer Vision-ECCV 2016: 14th European Conference, Amsterdam, The Netherlands, Oct. 11-14, 2016, Proceedings, Part I 14, pp. 21-37, Springer, 2016.

Liu, Y., et al., "Region-of-interest based resource allocation for conversational video communication of h. 264/AVC," IEEE Transactions on Circuits and Systems for Video Technology, 18(1): 134-139, 2008.

Lou, J., et al., "Transalnet: Towards perceptually relevant visual saliency prediction," Neurocomputing, 2022.

Lu, G., et al., "DVC: An end-to-end deep video compression framework," In Proceedings of the IEEE/CVF Conference on Computer Vision and Pattern Recognition, pp. 11006-11015, 2019.

Merritt, L., et al., "x264: A high performance h. 264/avc encoder," http://neuron2.net/library/avc/overview_x264_v8_5.pdf, 2006.

Raffin, A., et al., "Stable-baselines3: Reliable reinforcement learning implementations," Journal of Machine Learning Research, 22(268):1-8, 2021.

Schulman, J., et al., "Proximal policy optimization algorithms," arXiv preprint arXiv:1707.06347, 2017.

Shi, J., et al., "Reinforced bit allocation under task-driven semantic distortion metrics," In 2020 IEEE International Symposium on Circuits and Systems (ISCAS), pp. 1-5, IEEE, 2020.

Shor, J., et al., "The need for medically aware video compression in gastroenterology," arXiv preprint arXiv:2211.01472, 2022.

Singh, P., et al., "Video-analytics task-aware quad-tree partitioning and quantization for hevc," In 2022 IEEE International Conference on Image Processing (ICIP), pp. 2936-2940, IEEE, 2022.

Sullivan, G.J., et al., "Overview of the high efficiency video coding (hevc) standard," IEEE Transactions on Circuits and Systems for Video Technology, 22(12):1649-1668, 2012.

Sutton, R.S., et al., "Reinforcement Learning: An Introduction," The MIT Press, Cambridge, MA, 1998.

Wang, Z., et al., "Image quality assessment: from error visibility to structural similarity," IEEE Transactions on Image Processings, 13(4):600-612, 2004.

Wenger, S., et al., "254/avc over ip," IEEE Transactions on Circuits and Systems for Video Technology, 13 (7):645-656, 2003.

Wiegand, T., et al., "Overview of the h. 264/avc video coding standard," IEEE Transactions on Circuits and Systems for Video Technology, 13(7):560-576, 2003.

Windsheimer, M., et al., "On annotation-free optimization of video coding for machines," arXiv preprint arXiv:2406.07938, 2024.

Wu, C., et al., "QS-nerv: Real-time quality-scalable decoding with neural representation for videos," in ACM Multimedia 2024, 2024.

Xie, G., et al., "Hierarchical reinforcement learning based video semantic coding for segmentation," In 2022 IEEE International Conference on Visual Communications and Image Processing (VCIP), pp. 1-5, IEEE, 2022.

Ye, W., et al., "Mastering Atari games with limited data," Advances in Neural Information Processing Systems, 34:25476-25488, 2021.

Yu, F., et al., "BDD100K: A diverse driving dataset for heterogeneous multitask learning," In Proceedings of the IEEE/CVF Conference on Computer Vision and Pattern Recognition, pp. 2636-2645, 2020.

Zhang, H., et al., "Competitive learning for achieving content-specific filters in video coding for machines," arXiv preprint arXiv:2406.12367, 2024.

* cited by examiner

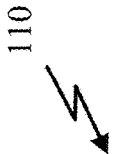
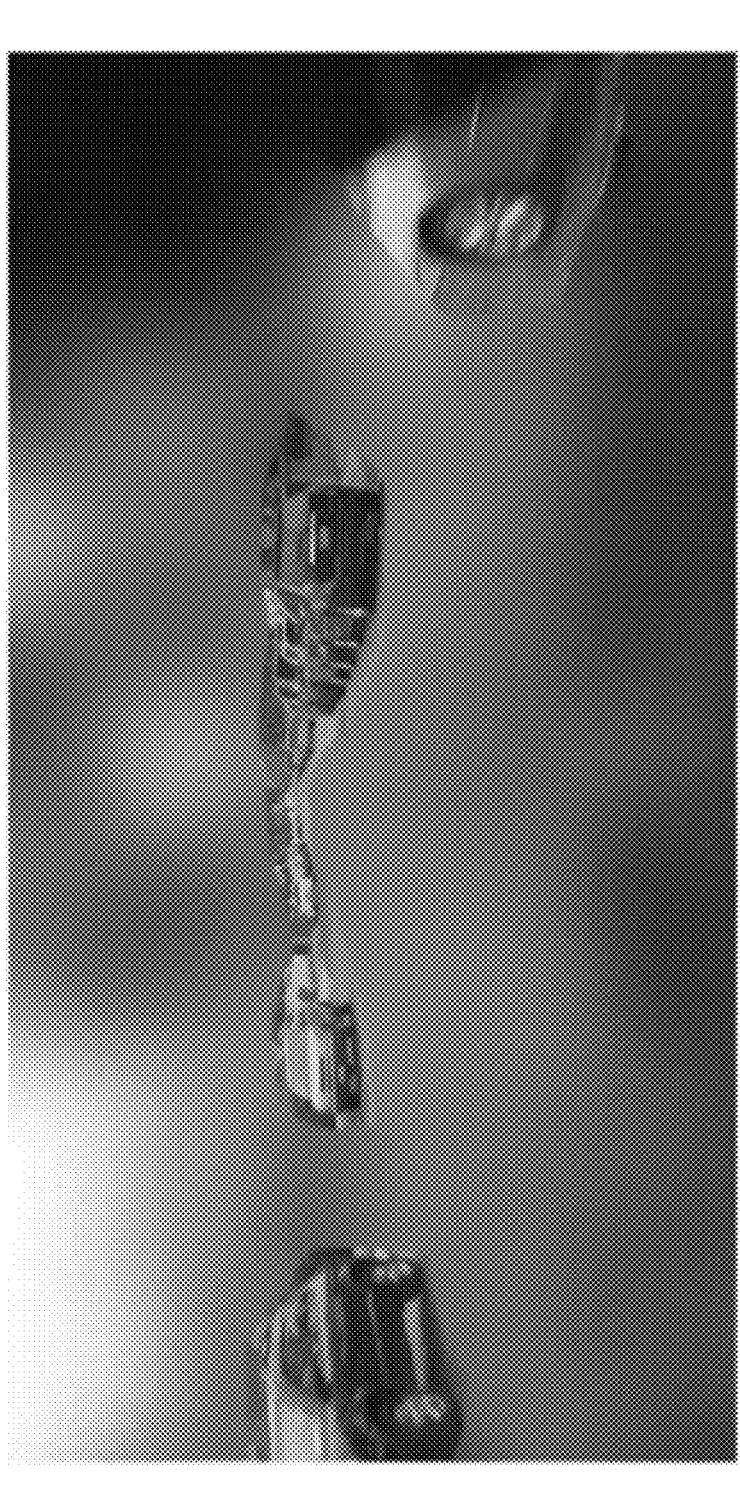
FIG. 1B

214

| -1 | -1 | 1 | 1 | 3 | 2 | 0 | -1 |
|----|----|----|----|----|----|----|----|
|  |  |  |  | ... | 1 | 2 | 0 |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

FIG. 2B

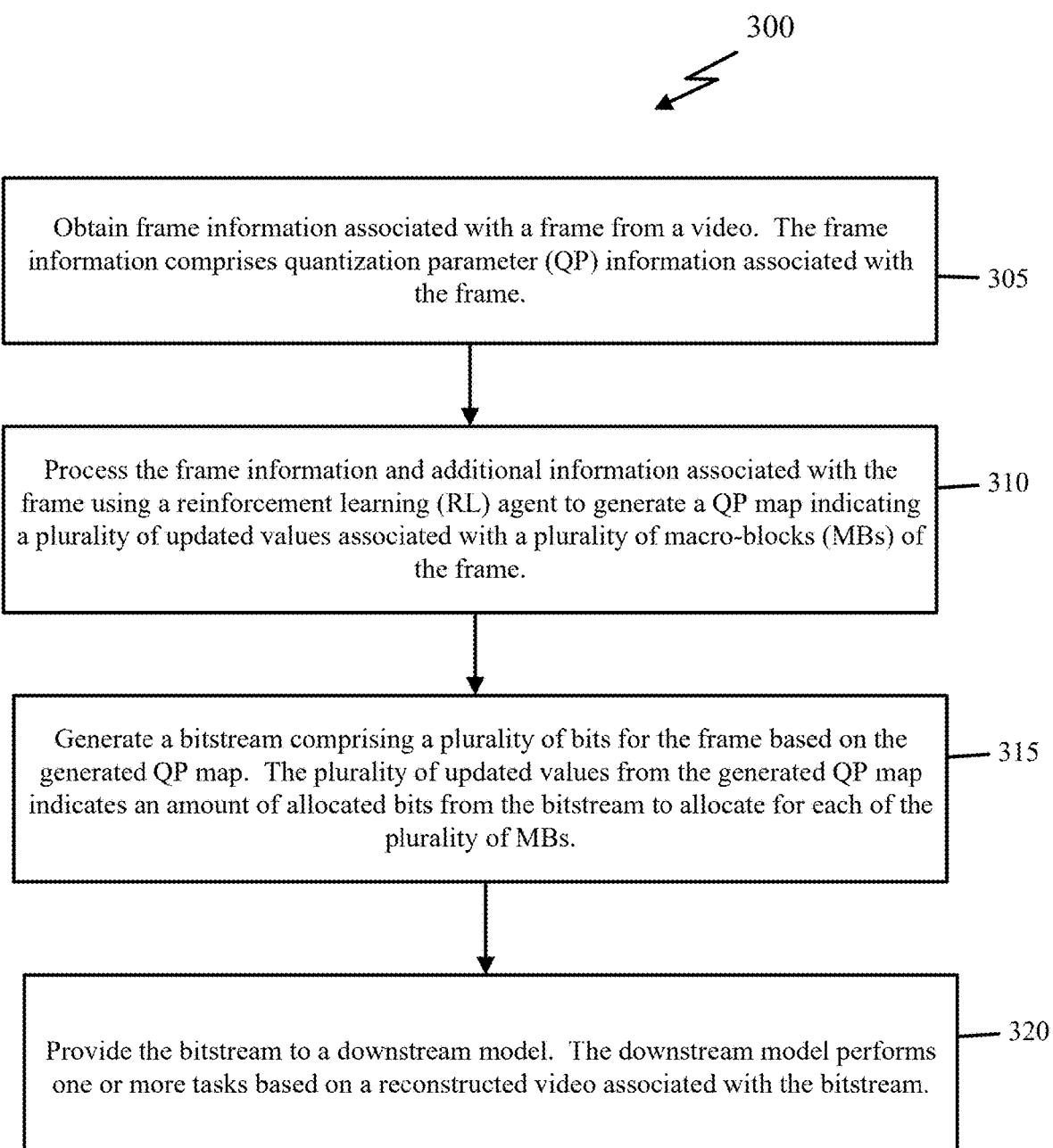

300

Obtain frame information associated with a frame from a video. The frame information comprises quantization parameter (QP) information associated with the frame. — 305

Process the frame information and additional information associated with the frame using a reinforcement learning (RL) agent to generate a QP map indicating a plurality of updated values associated with a plurality of macro-blocks (MBs) of the frame. — 310

Generate a bitstream comprising a plurality of bits for the frame based on the generated QP map. The plurality of updated values from the generated QP map indicates an amount of allocated bits from the bitstream to allocate for each of the plurality of MBs. — 315

Provide the bitstream to a downstream model. The downstream model performs one or more tasks based on a reconstructed video associated with the bitstream. — 320

FIG. 3A

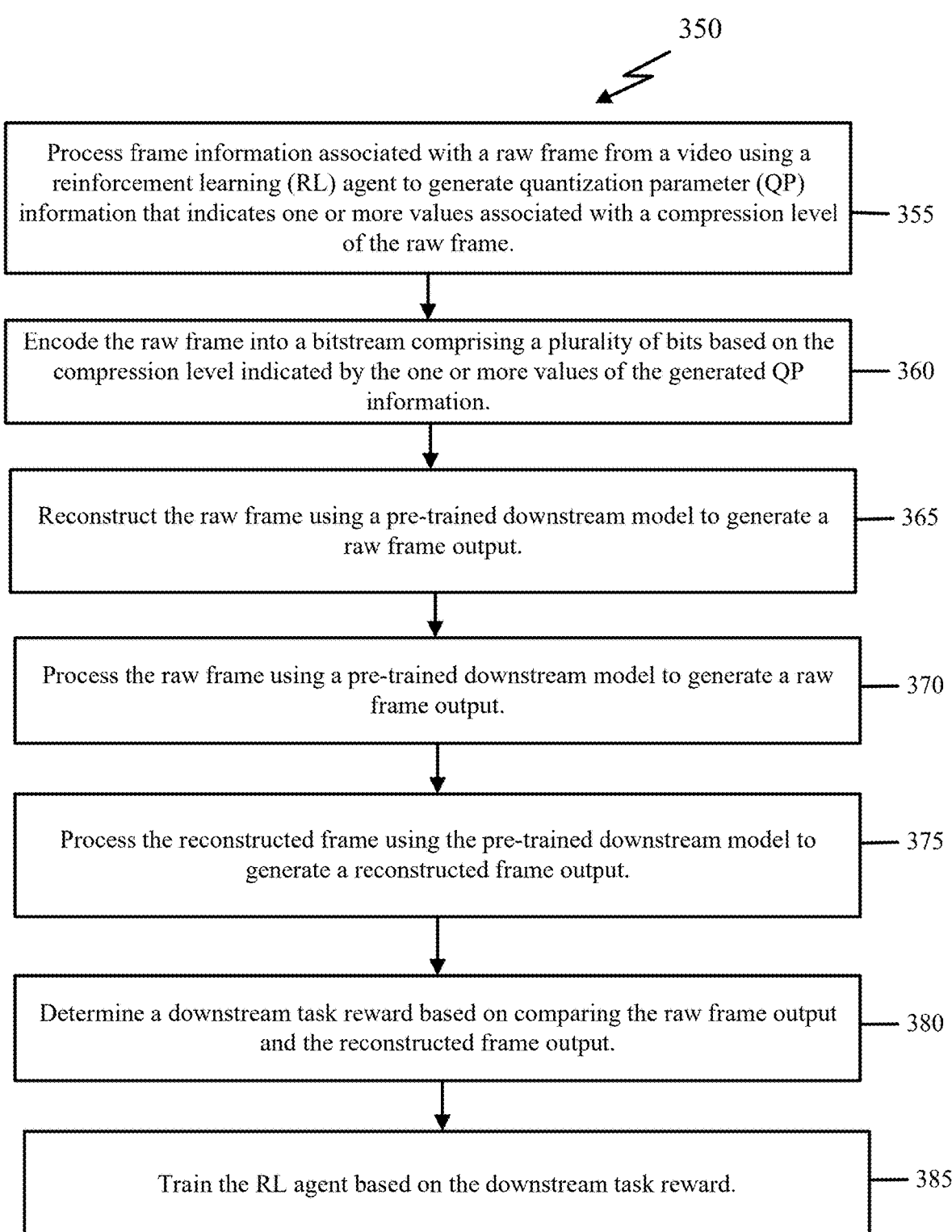

350

Process frame information associated with a raw frame from a video using a reinforcement learning (RL) agent to generate quantization parameter (QP) information that indicates one or more values associated with a compression level of the raw frame. ⎯ 355

Encode the raw frame into a bitstream comprising a plurality of bits based on the compression level indicated by the one or more values of the generated QP information. ⎯ 360

Reconstruct the raw frame using a pre-trained downstream model to generate a raw frame output. ⎯ 365

Process the raw frame using a pre-trained downstream model to generate a raw frame output. ⎯ 370

Process the reconstructed frame using the pre-trained downstream model to generate a reconstructed frame output. ⎯ 375

Determine a downstream task reward based on comparing the raw frame output and the reconstructed frame output. ⎯ 380

Train the RL agent based on the downstream task reward. ⎯ 385

CONTENT-BASED VIDEO COMPRESSION USING REINFORCEMENT LEARNING FOR VIDEO RATE CONTROL

CLAIM OF PRIORITY

This application claims the benefit of U.S. Provisional Application No. 63/702,980 titled "Content-Based Video Compression Using Reinforcement Learning For Video Rate Control For A Downstream Task," filed Oct. 3, 2024, the entire contents of which is incorporated herein by reference.

BACKGROUND

Conventional video compression algorithms may be designed for preserving how a video is perceived by humans. For instance, when a video is streamed to a device such as a user device (e.g., a mobile phone), a video encoder encodes the frames of the video into a bitstream that is then provided to the user device. The user device utilizes a video decoder to decode the bitstream and displays the video on a display for user consumption. However, in many modern applications such as autonomous driving, an overwhelming majority of videos are not being streamed to a user device for user consumption. Instead, the videos are being used in automated systems (e.g., by autonomous drones/cars or by security cameras) or in downstream tasks (e.g., object detection or recognition). For example, many videos are being served as input for artificial intelligence (AI) systems that perform one or more tasks such as object recognition or segmentation. Thus, while conventional video compression algorithms are configured to preserve how a video is perceived by humans, automated systems or downstream tasks may have different priorities. Accordingly, there is a need for optimizing video compressions for automated systems and/ or downstream tasks.

SUMMARY

Embodiments of the present disclosure relate to content-based video compression using reinforcement learning for video rate control. For example, video compression is an essential and widely studied problem, but the majority of video compression algorithms are designed for preserving how a video is perceived by humans. However, with the success of computer vision applications, many videos are used in automated systems (e.g., from autonomous drones and cars to security cameras) and in downstream tasks such as object detection or recognition. In these scenarios, compression should prioritize regions relevant to the task at hand (e.g., allocating more bits to objects than to the background). In other words, raw data is too expensive and existing encoders are geared to optimize video peak signal-to-noise ratio (PSNR), which may "waste" bits on task-irrelevant parts.

Many existing approaches for task-aware compression rely on deep encoding. This makes them computationally expensive and unsuitable for real-time applications or resource constrained environments. In contrast, standardized video encoders such as the ×264 encoder, are highly efficient but are not designed for adapting compression to specific tasks in real-time. Previous conventional approaches proposed to use standardized video encoders for downstream tasks, but usually for a specific task, and commonly employed big models before encoding. For instance, one conventional approach performed semantic compression by applying a heavy feature extractor before encoding using a ground-truth segmentation maps. While performing well at this setup, the conventional approach required large computation resources before encoding, is unable to be used for various tasks, and is not suitable for data collection.

Accordingly, embodiments of the present disclosure perform content-based video compression using reinforcement learning for video rate control (e.g., sub-frame rate control). Additionally, and/or alternatively, embodiments of the present disclosure may perform content-based video compression using RL for video rate control for a downstream task. For example, embodiments of the present disclosure describe systems and methods for RL Rate Control for Downstream Tasks (RL-RC-DoT). For example, the RL-RC-DoT process may solve the problem of tuning an efficient real-time video compression system to a downstream task without access to its ground truth labels during inference. For instance, the RL-RC-DoT process integrates a lightweight network on the video encoder side of an encoder, which is trained to control the encoding process such that the decoded output is ideal for the task at hand. By leveraging standardized codecs, the RL-RC-DoT process may be both computationally efficient and easily deployable across a range of devices. The RL-RC-DoT process may allow for real-time video compression without requiring ground truth for downstream tasks.

In some examples, standardized encoders (e.g., the ×264 encoder described above) might not be differentiable, which makes it difficult to optimize bit allocation for specific tasks. To overcome this, an RL mechanism is introduced that controls the Quantization Parameter (QP) at the macro-block level, which is configured to adjust the bit allocation for each block of the frame dynamically. This allows for efficient management of the bit-rate budget while optimizing task performance over an entire sequence of video frames. Experiments of the RL-RC-DoT process were performed, and it was demonstrated that this process yields significant improvements in rate-distortion trade-offs, not just for the task the encoder was trained on, but also for other related tasks, showcasing the robustness of the RL-RC-DoT process. Furthermore, the RL-RC-DoT process demonstrated generalizability by showing how an encoder trained on one model may improve performance for other models without additional tuning.

In an embodiment, a computer-implemented method for performing content-based video compression using reinforcement learning (RL) for sub-frame rate control is provided. The method includes obtaining frame information associated with a frame from a video, and the frame information comprises quantization parameter (QP) information associated with the frame. The method further includes processing the frame information and additional information associated with the frame using an RL agent to generate a generated QP map (e.g., a sub-frame QP map) indicating a plurality of updated values associated with a plurality of macro-blocks (MBs) of the frame. The method also includes generating a bitstream comprising a plurality of bits for the frame based on the generated QP map and providing the bitstream to a downstream model. The plurality of updated values from the generated QP map indicates an amount of allocated bits from the bitstream to allocate for each of the plurality of MBs. The downstream model performs one or more tasks based on a reconstructed video associated with the bitstream.

In another embodiment, a computer-implemented method for performing content-based video compression using reinforcement learning (RL) for video rate control for a downstream task is provided. The method includes processing frame information associated with a raw frame from a video using an RL agent to generate a generated QP map that indicates one or more values associated with a compression level of the raw frame and encoding the raw frame into a bitstream comprising a plurality of bits based on the compression level indicated by the one or more values of the generated QP map. The method further includes reconstructing the raw frame using the bitstream to obtain a reconstructed frame and processing the raw frame using a pretrained downstream model to generate a raw frame output. The method also includes processing the reconstructed frame using the pre-trained downstream model to generate a reconstructed frame output, determining a downstream task reward based on comparing the raw frame output and the reconstructed frame output, and training the RL agent based on the downstream task reward.

BRIEF DESCRIPTION OF THE DRAWINGS

The present systems and methods for content-based video compression using reinforcement learning for video rate control are described in detail below with reference to the attached drawing figures, wherein:

FIG. 1B shows a reconstructed frame from an encoded bitstream from a video encoder, in accordance with one or more embodiments of the present disclosure;

FIG. 2B shows an example sub-frame quantization parameter map that is generated by an RL agent, in accordance with one or more embodiments of the present disclosure;

FIG. 3A illustrates a flowchart of a method for performing content-based video compression using reinforcement learning (RL) for sub-frame rate control, in accordance with one or more embodiments of the present disclosure;

FIG. 3B illustrates a flowchart of a method for performing content-based video compression using reinforcement learning (RL) for video rate control for a downstream task, in accordance with one or more embodiments of the present disclosure;

DETAILED DESCRIPTION

Figure 1A:
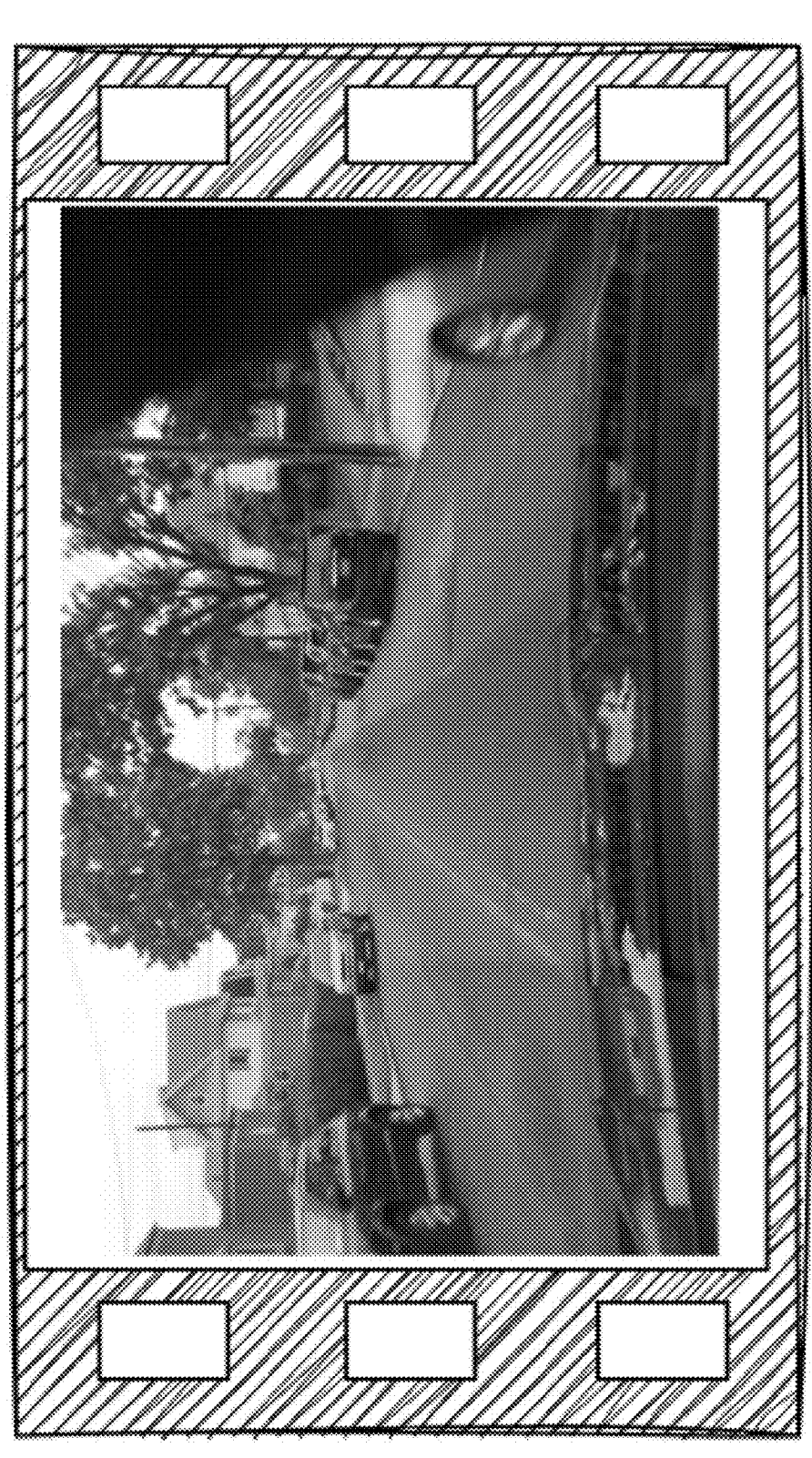
FIG. 1A shows a frame from a video that shows a person driving a vehicle.

Systems and methods are disclosed herein that relate to performing content-based video compression using reinforcement learning for video rate control, and in particular, to an RL Rate Control for Downstream Tasks (RL-RC-DoT) process that optimizes the video compression algorithm for downstream tasks. For example, conventional video encoders optimize compression for human perception by minimizing reconstruction error under bit-rate constraints. In many modern applications such as autonomous driving, an overwhelming majority of videos serve as input for artificial intelligence (AI) systems performing tasks such as object recognition or segmentation, rather than being watched by humans. Thus, traditional video compression algorithms, which are optimized for viewing by a human, are inadequate for use by AI systems. For instance, FIG. 1A shows a frame 100 from a video that shows a person driving a vehicle. As shown, the frame 100 shows the vehicle being driven by the person, vehicles on the side of the road, and background features such as trees, homes, the sky, and other background features. For a person viewing the video, many of the background features are important as they provide context for the video and thus, a conventional video encoder may keep many bits of the bitstream available for the background features.

In contrast, automated systems or downstream tasks may only utilize certain aspects of the frame 100 to perform the downstream application or tasks and thus different aspects are prioritized. For example, for a downstream task such as autonomous driving, the downstream task may involve object detection and segmentation to ensure that the vehicle avoids any collisions. As such, the background features such as the homes or the sky in the background are unnecessary and this should be considered when performing video compression. FIG. 1B shows a reconstructed frame 110 from an encoded bitstream from a video encoder, in accordance with one or more embodiments of the present disclosure. For instance, the reconstructed frame 110 fails to show details on the background features of the video, which is necessary for human perception, but unnecessary for the downstream task (e.g., object detection for autonomous driving). Rather, the reconstructed frame 110 primarily focuses on the important aspects of the downstream task such as the vehicles on the road, which are used for object detection so as to avoid potential collisions.

In other words, as shown in the reconstructed frame 110, there is a need to optimize the encoder for a downstream task instead of for perceptual image quality. However, a major challenge is how to combine such downstream optimization with existing standard video encoders, which are highly efficient and popular. Thus, in some variations, embodiments of the present disclosure may address this challenge by controlling the Quantization Parameters (QPs) at the macro-block level to optimize the downstream task. This granular control allows for prioritizing encoding for task-relevant regions within each frame. Embodiments of the present disclosure may formulate this optimization problem as an RL task, where the agent learns to balance long-term implications of choosing QPs on both task performance and bit-rate constraints. In some instances, the policy of embodiments of the present disclosure does not require the downstream task as an input during inference, which may make it suitable for streaming applications and edge devices such as vehicles. Furthermore, embodiments of the present disclosure were demonstrated to have significant improvements for two tasks—car detection and region of interest (ROI) (saliency) encoding. In some instances, embodiments of the present disclosure may improve task performance for a given bit rate compared to traditional task agnostic encoding methods, which may pave the way for more efficient task-aware video compression.

Additionally, and/or alternatively, in some examples, real-world deployment of compression systems may further complicate matters. For instance, video data may be collected in real time from devices using low computational resources. The video data might not just be used for immediate inference and may instead also be used for training various models across multiple tasks. Furthermore, due to computational and hardware constraints, compression may be performed without access to the ground truth for the downstream tasks during the encoding process. As such, embodiments of the present disclosure may tackle these challenges by providing a general video compression process that may be adapted to any task, operates in real-time, imposes low computational demands on the encoding side, and requires no ground-truth labels.

As will be described in further detail below, embodiments of the present disclosure perform an RL-RC-DoT process that may be a task-aware video compression method and process that builds on top of existing encoders (e.g., an ×264 encoder) and does not include solving the task during inference. Additionally, and/or alternatively, embodiments of the present disclosure may optimize the rate parameter of every macro-block (MB) in the frame while optimizing the performance of a downstream task on the reconstructed video under bit-rate constraints. Additionally, and/or alternatively, embodiments of the present disclosure may describe an architecture that outputs multiple actions, a tailored reward for this problem, and/or a task-prediction loss term. Also, embodiments of the present disclosure showed improved rate-distortion trade-off on two tasks (e.g., car detection and ROI encoding with only small interference to image quality), and further showed robustness to task shift when tested on a related-but-different task than used for training.

Figure 2A:
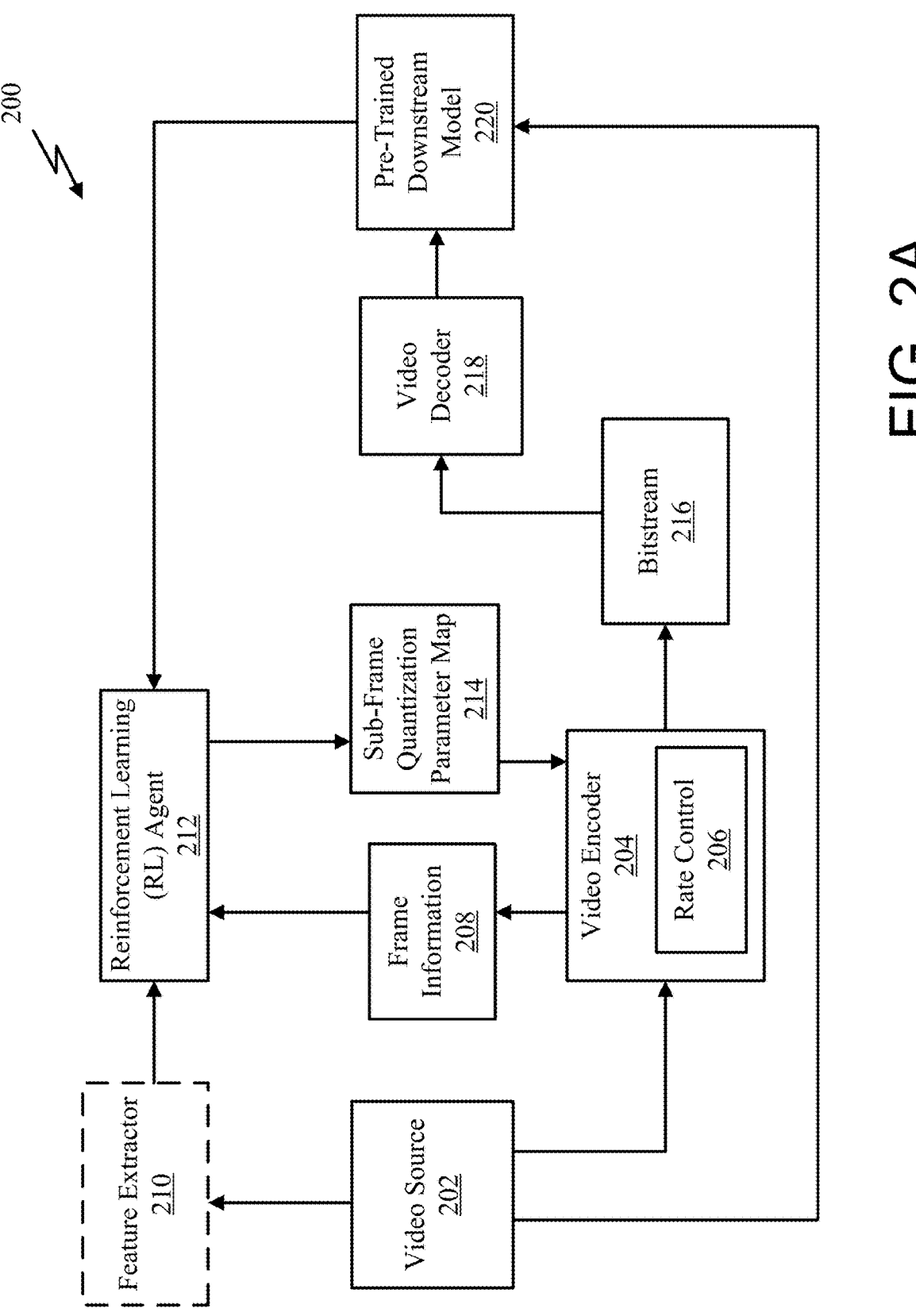
FIG. 2A shows an overview of a training phase for performing content-based video compression using RL for video rate control, in accordance with one or more embodiments of the present disclosure.

FIG. 2A shows an overview 200 of a training phase for performing content-based video compression using RL for video rate control, in accordance with one or more embodiments of the present disclosure. Each block of the overview 200, described herein, may comprise a computing process that may be performed using any combination of hardware, firmware, and/or software. For instance, various functions may be carried out by a processor executing instructions stored in memory. The overview 200 may also be embodied as computer-usable instructions stored on computer storage media. The overview 200 may be provided by a standalone application, a service or hosted service (standalone or in combination with another hosted service), or a plug-in to another product, to name a few. In addition, the overview 200 is described, by way of example, with respect to a computing system and/or platform. However, this overview 200 may additionally or alternatively be executed by any one system, or any combination of systems, including, but not limited to, those described herein. Furthermore, persons of ordinary skill in the art will understand that any system that performs the overview 200 is within the scope and spirit of embodiments of the present disclosure.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

In addition, one or more computing systems or computing platforms may be used to perform one or more blocks of the overview 200. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location.

The overview 200 includes a video source 202, a video encoder 204 that includes rate control 206, frame information 208, an optional feature extractor 210, an RL agent 212, a sub-frame quantization parameter map 214, a bitstream 216, a video decoder 218, and a pre-trained downstream model 220. Specifically, the overview 200 shows a training phase for training the RL agent 212 for a downstream task. In operation, the video source 202 may include a video comprising a plurality of frames. A frame of the video (e.g., the frame 100 from FIG. 1A above) may be provided to the video encoder 204. The video encoder 204 may process the frame to generate frame information 208 that is provided to the RL agent 212. For example, the frame information 208 may include, but is not limited to, bit budgets, variability or spatial/temporal complexity, previous quality metric scores (e.g., peak signal-to-noise ratio (PSNR) and/or structure similarity index measure (SSIM)), frame type, a base encoder Quantization Parameters (QP) map, encoding parameters, a current stage of the encoder 204, current bitstream size, visual content associated with one or more frames of the video source 202 (e.g., visual content of the current frame or of a previous frame), and/or next frame statistics that may be extracted from the encoder 204 such as a frame QP value, a next frame type, and/or a next frame complexity. For instance, the video encoder 204 may perform video compression, which is the process of reducing the size of digital video files while maintaining acceptable visual quality. The primary goal of video compression is to eliminate redundant and less perceptible information from the video data according to constraints such as bit-rate of the target video (e.g., the vide source 202), while maintaining sufficient visual quality.

One key aspect of video compression is the use of QP (e.g., a QP map comprising a plurality of QP values and/or a single QP value for the entire frame). QP values control the level of compression applied to the video data, with higher values resulting in more compression but lower quality, and lower values preserving more detail but producing larger file sizes. In video encoding, QP may be applied at different levels of granularity. Frame QP refers to setting a single QP value for an entire frame, which is useful for maintaining consistent quality across the frame but might not be optimal for all areas. Per-macro-block (MB) QP, on the other hand, allows for finer control by assigning different QP values to individual MBs within a frame, usually in small perturbations from a pre-assigned frame QP. This approach enables the encoder to apply more compression to less important or visually complex areas while preserving quality in critical regions. Per-MB QP may lead to more efficient compression and better overall visual quality, as it adapts to the local characteristics of the video content. It is especially suitable for task-aware optimization since most tasks target specific areas in the frame (e.g., object detection and segmentation for autonomous driving prioritizes vehicles on the road for collision avoidance).

Prior to describing embodiments of the present disclosure further, one may wonder why video compression is necessary at all if a downstream task is given. For instance, in the autonomous vehicle example, if a car detector is available, a question may be asked as to why not run that detector on the vehicle, and save only its decision instead of the compressed video. There are several reasons to not take this approach. For instance, many downstream tasks require resource-heavy networks that cannot run efficiently on-device, making it impractical to process the data locally. In addition, sending only task-specific features limits human interpretability, as there would be no watchable video for explainability. Further, this also confines the data to a single task, preventing its reuse for other applications or analysis. Additionally, large-scale data collection, such as in autonomous driving, depends on compressed video storage; using features alone would limit future training and fine-tuning opportunities. Also, task-specific features are often tied to a particular model, making them incompatible with new models, while compressed video remains adaptable across different systems. As such, in view of the above, embodiments of the present disclosure are shown to allow different downstream models to achieve high performance using the same compressed data. In addition, embodiments of the present disclosure may further preserve a video such that the frames of the video (e.g., the reconstructed frame 110 of FIG. 1B) may also be meaningful to a person.

Turning back to FIG. 2A, in some embodiments, the video encoder 204 may be a conventional encoder such as an ×264 video encoder and/or an NVIDIA encoder (NVENC). The video encoder 204 may process the frame from the video source 202 to generate QP information. The QP information may be and/or include a single QP value for an entire frame (e.g., an initial frame level QP value) and/or an initial QP map. The initial QP map may be a data structure and/or representation that divides the frame into a plurality of blocks (e.g., MBs) and each block (e.g., each MB) may be associated with a QP value. As such, the initial QP map may include and/or indicate a plurality of QP values and each QP value may be associated with an MB from the frame. In some examples, a larger QP value may indicate greater compression applied to the video data and a smaller QP value may indicate less compression applied to the video data. The video encoder 204 may provide the frame information 208, which may include the QP information (e.g., the initial QP map and/or the initial frame level QP value), and/or additional information associated with the frame (e.g., the encoding parameters) to the RL agent 212.

In addition to the frame information 208, the RL agent 212 may obtain additional information from the video source 202. The feature extractor 210 may be optional. When not present, the RL agent 212 may obtain the frame from the video source 202 (e.g., the same frame that was processed by the video encoder 204 to generate the frame information 208). For example, the RL agent 212 may obtain color space values of the frame such as the raw red, green, blue (RGB) pixel values and/or the luma, blue projection, and red projection (YUV) pixel values associated with the frame. Additionally, and/or alternatively, the RL agent 212 may obtain information associated with hyperspectral images and/or medical images (e.g., magnetic resonance imaging (MRI) images) such as medical image values (e.g., x-ray values and/or ultrasound values). In some examples, downsampling of the frame may be performed and the downsampled values (e.g., the downsampled RGB or YUV values) may be provided to the RL agent 212.

In some variations, the feature extractor 210 may be present. The feature extractor 210 may be configured to perform feature extraction and extract features from the frame of the video source 202. For instance, the feature extractor 210 may be a light pre-trained deep network or another feature extractor system and/or algorithm that performs feature extraction to extract the features of the frame. The features of the frame may be provided to the RL agent 212 in addition to or as an alternative to the color space values of the frame. In some examples, the feature extractor 210 may be and/or include any machine-learning model including, but not limited to, a deep network, boosting trees, and/or autoencoders.

The RL agent 212 obtains the features of the frame, the color space values, and/or the frame information 208, and processes the obtained data to generate a sub-frame QP map 214 that is then provided back to the video encoder 204. The generated sub-frame QP map 214 may be an updated QP map that prioritizes aspects that are important to the downstream task. For example, RL is a field dealing with sequential decision making in unknown environments. To formulate a problem using RL, its underlying Markov Decision Process (MDP) is defined. An MDP is defined by a tuple ($\mathcal{S}$, $\mathcal{A}$, P, R, y), where $\mathcal{S}$ is a finite set of states, $\mathcal{A}$ is a finite set of actions, P is a state transition probability function, P (s'|s, a), R is a reward function, R(s, a) and $\gamma \in [0,1]$ is a discount factor.

At each time step t, the agent (e.g., the RL agent 212) observes the current state $s_t \in \mathcal{S}$ and chooses an action $a_t \in \mathcal{A}$. The environment then transitions to a new state $S_{t+1}$ with probability $P(S_{t+1}|s_t, a_t)$ and the agent receives a reward $r_t = R(s_t, a_t)$. The goal of the agent is to find a policy $\pi$: $\mathcal{S} \to \mathcal{A}$ that maximizes the expected cumulative discounted reward:

$$\max_{\pi} J^\pi = \mathbb{E}_{\pi, s_0 \sim \mu, s_{t+1} \sim P} \left[ \sum_{t=0}^{\infty} \gamma^t R(s_t, \pi(s_t)) \right]$$

To maximize the expected cumulative discounted reward, many algorithms were proposed that vary in their assumptions on the problem, computational complexity, and data requirements. The most widely used algorithm today is the RL proximal policy optimization (PPO) algorithm, which directly optimizes the policy using full trajectories while constraining it from diverging.

Returning back to the RL agent 212, the finite set of states may be the obtained information such as the features of the frame, the color space values, and/or the frame information 208. The finite set of actions may be the output from the RL agent 212, which may be the sub-frame quantization parameter map 214. For example, based on processing the features of the frame, the color space values, and/or the frame information 208, the RL agent 212 generates the sub-frame quantization parameter map 214, which indicates the updated QP values to be used for generating the bitstream 216. The RL agent 212 may be and/or include any type of RL algorithm that is used to optimize the cumulative reward over time such as, but not limited to, the PPO algorithm, a soft actor critic (SAC) algorithm, and/or an advantage actor critic (A2C) algorithm.

Figure 2B:
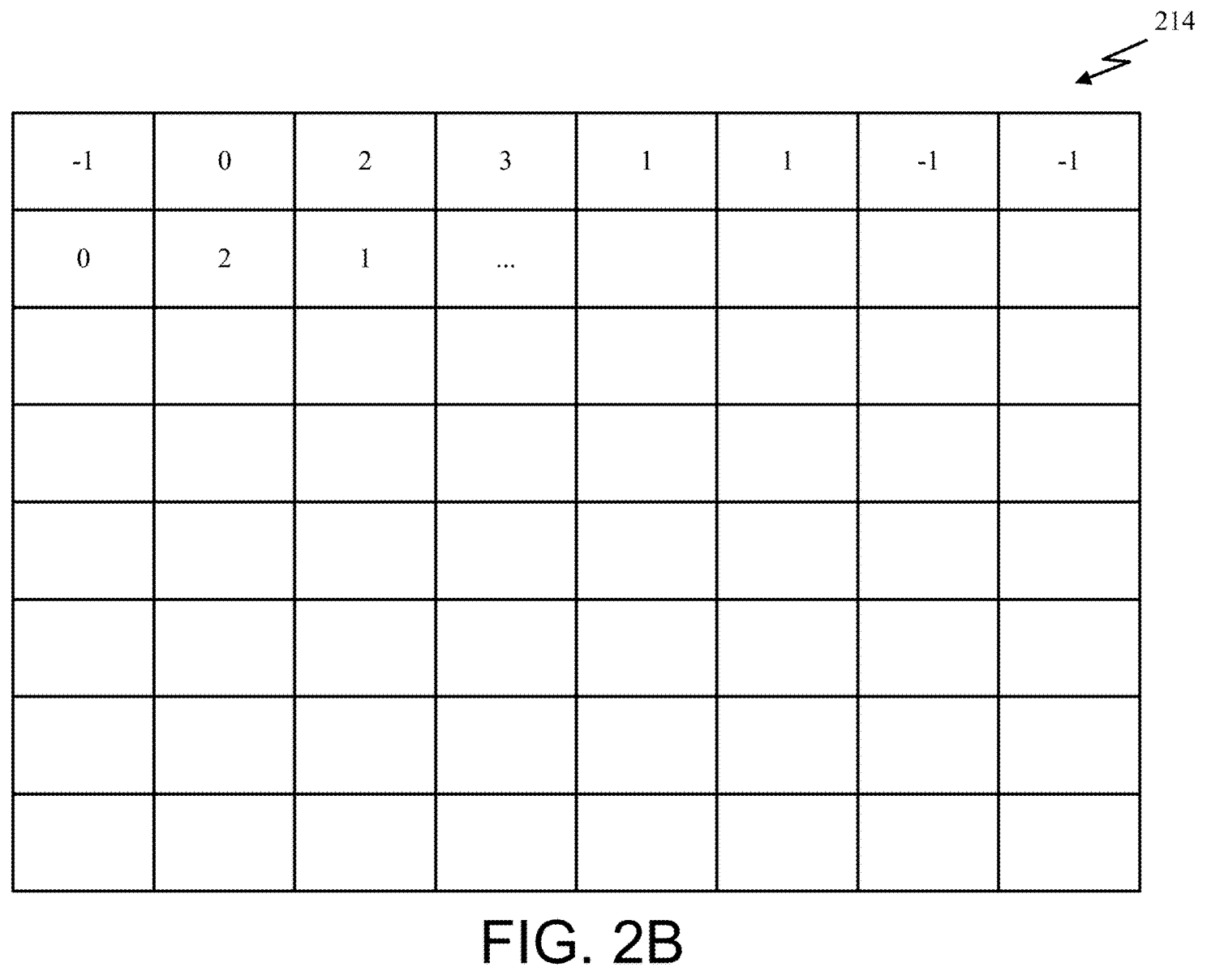

FIG. 2B shows an example sub-frame quantization parameter map 214 that is generated by an RL agent 212, in accordance with one or more embodiments of the present disclosure. For instance, in some embodiments, the frame from the video source 202 may be a 512×512 pixel frame. Thus, each frame may be broken into MBs (e.g., individual blocks) that include 64×64 pixels. Based on the QP information (e.g., the initial frame level QP value and/or an initial QP map) and/or other information, the RL agent 212 may generate the sub-frame quantization parameter map 214 shown in FIG. 2B. For instance, for each of the 64×64 pixel blocks (e.g., each of the MBs), the sub-frame quantization parameter map 214 indicates an updated QP value (e.g., a new QP value that may be different from the initial frame level QP value and/or a QP value associated with the pixel block that is indicated by the initial QP map). In other words, the RL agent 212 may process the finite set of states described above to generate and/or determine a finite set of actions (e.g., the new or updated QP values for each of the pixel blocks for the frame). The dimensions of the pixel frame, pixel blocks, and the QP values are merely exemplary and the RL agent 212 may process and/or generate sub-frame quantization parameter maps 214 for any dimension of pixel frame and/or pixel block. Furthermore, the data structure for the sub-frame quantization parameter map 214 shown in FIG. 2B is merely exemplary and any data structure may be used to represent the sub-frame quantization parameter map 214. In addition, the " . . . " shown in FIG. 2B indicates that the other blocks may include QP values that are not shown given that FIG. 2B is merely an example.

In some examples, instead of generating the sub-frame quantization parameter map 214 that includes updated QP values for each of the different MBs (e.g., pixel blocks), the RL agent 212 may generate an updated single frame level QP value. In other words, based on the RL agent 212 obtaining QP information comprising the initial frame level QP value, the RL agent 212 may generate an updated frame level QP value (e.g., a single updated QP value for the entire frame). To put it another way, the sub-frame quantization parameter map 214 may include a single updated frame level QP value for the entire frame.

In some instances, instead of the data structure of the sub-frame quantization parameter map 214 representing QP values to be used to generate the bitstream 216, the sub-frame quantization parameter map 214 may indicate a value representing a delta (e.g., difference) between the QP information and the block specific QP (e.g., a new or updated QP value that are determined by the RL agent 212). For instance, for the first block of FIG. 2B, the value "−1" may represent a difference between the frame level QP and the block specific QP. As such, the sub-frame quantization parameter map 214 may include a plurality of values such as the QP values (e.g., updated QP values) and/or the delta values (e.g., the value indicating a difference between the frame level QP and the block specific QP). In other instances, based on the QP information including the initial QP map, the sub-frame quantization parameter map 214 may indicate delta values representing a delta between the initial QP value for the particular MB from the initial QP map and the block specific QP.

In some variations, due to the convergence of reinforcement learning algorithms on high-dimensional action spaces presenting significant computational challenges, embodiments of the present disclosure may implement a hierarchical approach. For example, during the training phase, embodiments of the present disclosure may operate on a lower-resolution action space, which is subsequently upsampled to the original dimensions through interpolation. This dimensionality reduction technique may facilitate more efficient training while maintaining the ability to generate fine-grained QP assignments. For instance, for a 480×320 frame, which may include 600 MBs of 16×16 pixels each, to reduce the dimensionality of the action space of the RL agent 212, downsampling by a factor of five may be performed. This may result in a 6×4 grid of output values, which may then be upsampled during encoding to align with the full macro block resolution.

Afterwards, the RL agent 212 provides the generated sub-frame quantization parameter map 214 to the video encoder 204. The video encoder 204 includes rate control 206 that utilizes the sub-frame quantization parameter map 214 to generate the bitstream 216. For example, the video encoder 204 may compress the frame of the video source 202 using the sub-frame quantization parameter map 214 to generate the bitstream 216. As mentioned previously, the QP values may indicate an amount of compression to be applied to pixel block. For example, referring to FIG. 2B, the pixel block associated with the QP value of "0" may be compressed differently from the pixel block associated with the QP value of "2." As such, the video encoder 204 may allocate bits within the bitstream 216 for each of the pixel blocks based on the QP value indicated by the frame quantization parameter map 214. For example, in a simple example, the bitstream 216 may include 1,000 bits and the video encoder 204 may allocate bits for each pixel block of the frame based on the sub-frame quantization parameter map 214. For instance, the video encoder 204 may provide greater compression for a larger QP value (e.g., "2") and therefore, fewer bits from the bitstream 216 may be allocated to the larger QP values. In contrast, the video encoder 204 may allocate a greater amount of bits from the bitstream 216 for smaller QP values (e.g., "0"). In other words, the sub-frame quantization parameter map 214 may indicate an amount of bits of the bitstream 216 to allocate to each of the MBs such as a number of allocated bits from the bitstream 216 to allocate for each of the plurality of MBs or a fraction of allocated bits from the bitstream 216 to allocate for each of the plurality of MBs.

Returning to FIG. 2A, the bitstream 216 is provided to the video decoder 218, which reconstructs the frame using the bitstream 216. The reconstructed frame is then provided to the pre-trained downstream model 220 that is configured to perform one or more tasks. For instance, in the example above, the downstream task may include object detection and segmentation for autonomous driving. Thus, the pre-trained downstream model 220 may be utilized for object detection and segmentation. As such, a reconstructed frame such as the frame 110 shown in FIG. 1B may be processed by the pre-trained downstream model 220 to perform object detection and segmentation. Then, the output from the pre-trained downstream model 220 based on processing the reconstructed frame may be used to train the RL agent 212.

For example, during the training phase shown in overview 200, the RL agent 212 may be trained using rewards associated with the pre-trained downstream model 220. For instance, in each iteration for processing a frame of the video source 202, the raw frame of the video source 202 may be processed by the pre-trained downstream model 220 to generate a raw frame output (e.g., an output associated with the raw frame such as an output comprising bounding boxes for the detected objects within the raw frame). Similarly, the reconstructed frame may be processed by the pre-trained downstream model 220 to generate a reconstructed frame output (e.g., an output comprising bounding boxes for the detected objects within the reconstructed frame). A comparison between the raw frame output and the reconstructed frame output may be performed to obtain one or more rewards or objectives associated with the downstream task (e.g., a downstream task reward $r_{DT}$).

In other words, since ground-truth data may be unavailable, the RL-RC-DoT process may treat the downstream task's output on the original uncompressed frame (e.g., the raw frame) as a pseudo-ground truth, against which the task performance on the reconstructed frame is evaluated. This may be expressed by the below:

$$r_{DT} = D(f_{DT}(\text{frame}_{raw}), f_{DT}(\text{frame}_{rec}))$$

where $f_{DT}$ is a pre-trained model for the downstream-task and D is a task-specific loss function. For instance, in the example of vehicle detection, $f$ may be a pre-trained car detection model, and D is the precision between the reconstructed frame, $f(\text{frame}_{rec})$, with respect to the raw frame, $f$ ($\text{frame}_{raw}$).

Additionally, and/or alternatively, a second reward or objective may be determined. For example, in streaming allocations, exceeding the allocated bandwidth may result in frame dropping and consequently deteriorate the viewer experience. As such, the RL-RC-DoT process may utilize a second reward or objective (e.g., a bit rate reward $r_{bit-rate}$). For instance, to ensure compliance with the bit-rate constraint of the video encoder 204, the below expression for the bit rate reward $r_{bit-rate}$ may be determined:

$$r_{bit-rate} = -\left| \log\left( \frac{\text{current average bit-rate}}{\text{target bit-rate}} \right) \right|.$$

For example, the video encoder 204 may provide the target bit-rate and may calculate and/or determine the current average bit-rate based on generating the bitstream 216.

In some examples, the first reward (e.g., the downstream task reward) and the second reward (e.g., the bit rate reward) may be combined to determine an overall reward that is used to train the RL agent 212. For instance, in some variations, the overall reward r may be a weighted reward is expressed as:

$$r = r_{bit-rate} + \lambda r_{DT}$$

where $\lambda$ may be a hyper-parameter that is used to optimize the rate-performance trade-off. The overall reward r may be used to determine a loss (e.g., a loss that includes a block-wise prediction loss) that is then used to train the RL agent 212 via back-propagation.

For example, after calculating the overall reward (e.g., a combination of the downstream task reward and the bit rate reward), information associated with processing the frame may be stored in a data buffer. Then, the overview 200 may then be repeated for a second frame of the video source 202 to obtain a new sub-frame quantization parameter map 214, additional rewards (e.g., a second downstream task reward and a second bit rate reward), and/or other data. As such, for each frame, the data buffer may store information such as the information obtained by the RL agent 212 (e.g., the frame information 208, the features associated with the video source 202, and/or the color space values), the output from the RL agent 212 (e.g., the sub-frame quantization parameter map 214), and the reward(s) (e.g., the overall reward, the downstream task reward, and/or the bit rate reward). Following, based on the information from the data buffer for the video source 202, a loss may be determined and used to train the RL agent 212.

In other words, in conventional RL problems, the reward is typically a black-box directly mapping the state to a continuous score. It was recently shown that predictive modeling of rewards—implemented as auxiliary heads alongside policy or value networks may significantly enhance agent performance. In the RL-RC-DoT process, the rewards described above present a unique characteristic: the reward signals for various downstream tasks are often compositional, derived from aggregating scores across granular components of the input frame (e.g., the frame of the video source 202). For example, in the case of saliency-weighted PSNR, the reward is computed by aggregating per-pixel reconstruction errors. Leveraging this decomposable nature of rewards, the RL-RC-DoT process augments the learning process with an auxiliary prediction loss for these sub-scores during backpropagation. Specifically, the RL-RC-DoT process introduces a block-wise prediction loss that aims to predict the individual block reward information that contribute to the overall task score. This approach of incorporating auxiliary prediction loss for macro-block level reward information may enhance the performance of the RL agent 212. For instance, it may provide a more granular learning signal, allowing the RL agent 212 to understand the impact of its actions on individual components of the reward. In addition, by learning to predict these sub-scores (e.g., the sub-frame quantization parameter map 214 described above), the RL agent 212 may develop a richer internal representation of the task structure. Further, the RL-RC-DoT process may align the learning of the RL agent 212 more closely with the actual composition of the reward, which may lead to faster convergence and more stable learning.

In some examples, since the rewards described above may inherently carry spatial information, a separate score for each individual block (e.g., MB) may be computed. For example, when calculating the precision score for a task such as a car detection task, embodiments of the present disclosure may focus solely on the relevant region within each block. This approach may allow for outputting a matrix of block-specific rewards instead of a single aggregated reward for the entire frame. To put it another way, a reward (e.g., the overall reward r) might not be a single reward for the entire frame, but may instead be a data representation (e.g., a matrix) indicating a plurality of rewards. Each of the rewards within the data representation may be associated with a particular MB. For instance, referring back to FIG. 2B, the sub-frame quantization parameter map 214 includes QP values for each of the individual MBs. Similarly, a data representation that is similar to the sub-frame quantization parameter map 214 may include one or more rewards for each of the individual MBs (e.g., a first reward for a first individual MB, a second reward for a second individual MB, and so on).

In some embodiments, an RL-RC-DoT process may optimize a plurality of values such as QP values and/or the delta values (e.g., MB QP delta values) during video encoding. To formalize the training framework, embodiments of the present disclosure may cast the video compression problem with respect to a downstream task as an MDP. Embodiments of the present disclosure may define the state of the environment to be block-wise statistics extracted from an ×264 MB-tree mode (e.g., block energy cost and/or inverse quantization scaling factor) and global statistics (e.g., bit-stream size and/or percentages of P blocks).

Figure 2C:
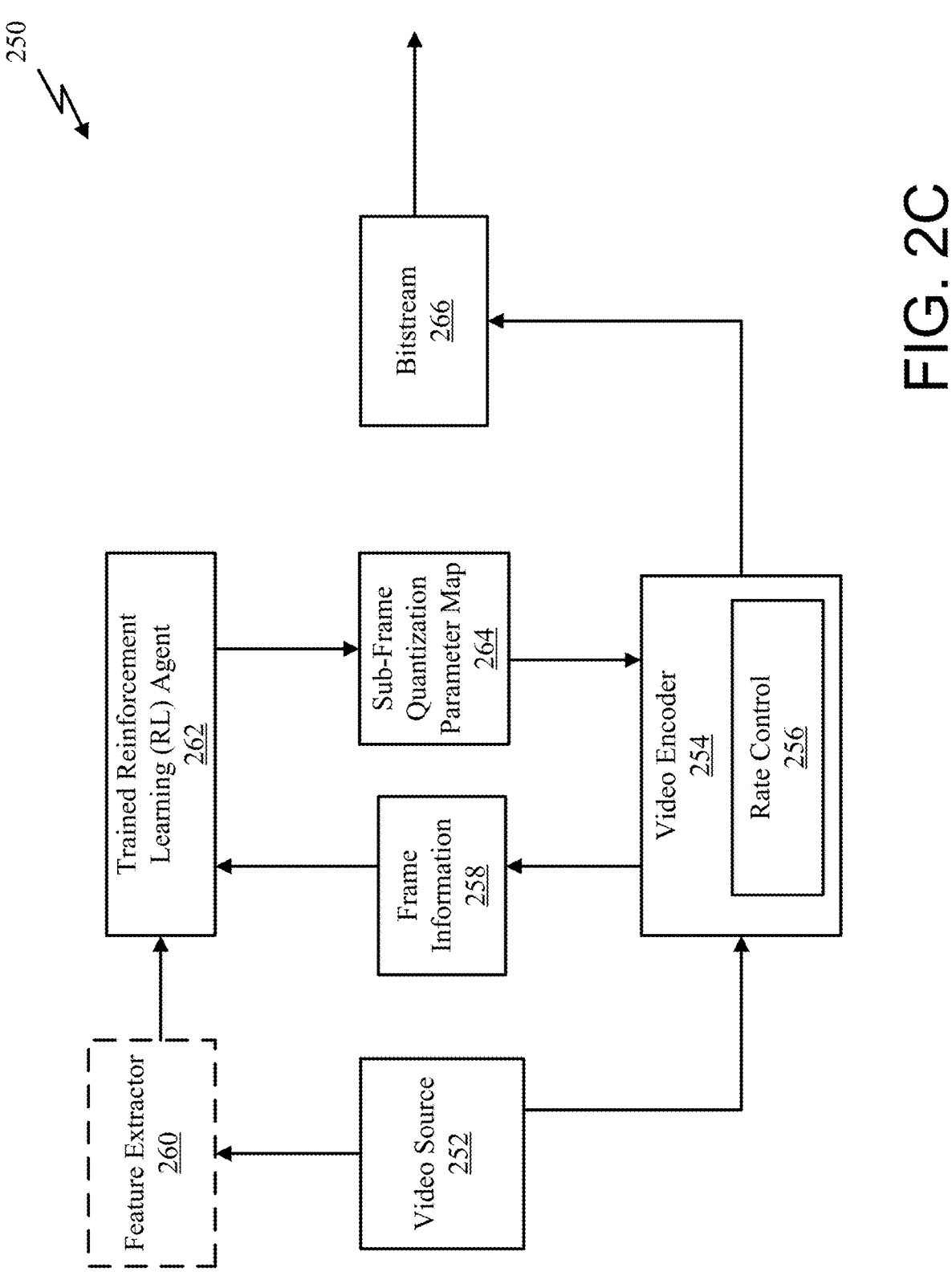
FIG. 2C shows an overview of an inference phase for performing content-based video compression using RL for video rate control, in accordance with one or more embodiments of the present disclosure.

After training the RL agent 212, the inference phase may be performed, which is shown in FIG. 2C. For instance, FIG. 2C shows an overview 250 of an inference phase for performing content-based video compression using RL for video rate control, in accordance with one or more embodiments of the present disclosure.

In FIG. 2C, the video source 252, the optional feature extractor 260, the frame information 258, the sub-frame quantization parameter map 264, the video encoder 254, the rate control 256, and the bitstream 266 may be similar and/or function similarly to the video source 202, the video encoder 204, the rate control 206, the frame information 208, the optional feature extractor 210, the sub-frame quantization parameter map 214, and the bitstream 216 from FIG. 2A. In addition, the trained RL agent 262 may be the RL agent 212 from FIG. 2A that has been trained based on the overview 200. Furthermore, as shown, the video decoder 218 and the pre-trained downstream model 220 are not present in FIG. 2C. Instead, during inference, an inference video decoder and an inference pre-trained downstream model may be located in a geographically different location than the aspects shown in FIG. 2C. In other words, given that video compression is utilized when transmitting information (e.g., a video source 252) to a new destination, during inference, the inference video decoder and the inference pre-trained downstream model may be located within a different location (e.g., a first system may include the trained RL agent 262 and/or other aspects shown in FIG. 2C and a second system may include the inference video decoder and/or the inference pre-trained downstream model).

In some examples, the downstream model 220 and/or the inference downstream model may be configured to perform one or more tasks such as action recognition. For instance, the video sources 202 and 252 may indicate people performing different actions such as brushing their hair, jumping a ball, or dancing. During training, the reward may be determined at the end of the video from the video source 202 that encourages allocating additional bits from the bitstream 216 to key frames for recognizing the actions. In other examples, the one or more tasks may include anomaly detection for surveillance cameras (e.g., specific frames in the video source 202 and/or 252 that may include abnormal scene changes). In such cases, the reward during the training phase may be given per frame and represent whether a real anomaly was detected in the reconstructed frame. In yet other examples, the downstream tasks may assign scores for each pixel such as segmentation or object detection (e.g., for autonomous driving). In such examples, the reward may be averaged over the entire frame to produce per frame rewards. Further, additional per-pixel information may be used as additional features for decision making, or for accelerating the convergence of the training process.

Thus, as shown in FIG. 2C, the trained RL agent 262 only utilizes the frame information 258, the features extracted by the feature extractor 260, and/or the information from the video source 252. In other words, the trained RL agent 262 does not utilize any feedback or information from the downstream inference model. As such, the RL-RC-DoT process enables determining the rate parameters of the video encoder 254 per frame, on-the-fly and during video encoding, such that the performance of the downstream task is maximized and/or alternatively reduces the number of transmitted bits for the same performance of the inference downstream model (e.g., loss function), to reduce storage, bandwidth, memory demands, and/or latency.

In some examples, embodiments of the present disclosure may be adaptive to data, rather than preprogrammed and/or may optimize its allocation while taking into account the full extent of the video or a group of frames in the video, rather than making per-frame "narrow-sight" allocations.

In some instances, embodiments of the present disclosure may be based on a machine learning (ML) approach that learns the policy that optimizes the rate parameter and may further continuously improve and adjust to new types of videos. Additionally, and/or alternatively, embodiments of the present disclosure may optimize a downstream task (e.g., maximizes the performance of one or more downstream tasks, depending on the application). Further, embodiments of the present disclosure might not use the outputs from the downstream task during inference, which allows the encoding to operate smoothly on edge devices. Additionally, and/or alternatively, embodiments of the present disclosure optimize rate control over the entire video or a group of frames in the video (e.g., using RL to optimize the long-term implication of parameter selections such that the entire video is optimized). Additionally, and/or alternatively, embodiments of the present disclosure may control the rate parameter of a standardized video encoder (e.g., any type of standard video encoder) based on using a frame specific rate parameter (e.g., QP) that has a specific usage in controlling the bit-rate quality trade-off. Additionally, and/or alternatively, embodiments of the present disclosure may control compression at the sub-frame level (e.g., learning to predict a rate parameter for every sub-frame block or for groups of blocks depending on the application). Additionally, and/or alternatively, embodiments of the present disclosure may be applied to a real-time setting and implementation (e.g., allowing for on-the-fly compression without needing to analyze the full video in advance).

In some examples, embodiments of the present disclosure may perform content-based video compression using reinforcement learning for video rate control (e.g., sub-frame rate control). For instance, as mentioned above, in lossy video encoding, a decision is determined regarding the number of bits to allocate to encode each frame. Conventional video encoders may further allocate bits at a sub-frame resolution by breaking each frame into a grid of blocks (e.g., MBs). These video encoders may use a sub-frame rate controller (e.g., the rate control 206 of the video encoder 204) to select different rate parameters for different blocks in the same frame to maximize the quality of the video under the constrained desired bit-rate.

As such and as described in further detail above, embodiments of the present disclosure may train an RL agent (e.g., the RL agent 212 and/or 262) that selects the sub-frame rate parameters in every frame. The observation of the RL agent may be composed of frame statistics (e.g., the frame information 208 and/or 258, which is described above) and/or the input frame image (e.g., the frame from the video source 202 and/or 252). Additionally, and/or alternatively, the input frame image may first be processed by a lightweight pre-trained deep network or any other feature extractor (e.g., the feature extractor 210 and/or 260), and the output from the feature extractor may be provided to the RL agent. The policy of the RL agent may be to map these observations to the action, which may be the vector of sub-frame rate parameters for every sub-frame in the frame. The frame may then be encoded using the video encoder (e.g., the video encoder 204 and/or 254) and the decoded (e.g., reconstructed frame) may also be generated as part of the process.

During training, the RL agent 212 may optimize a weighted average of two rewards. The first may encourage obeying the constraint over the desired bitrate. The second reward may maximize the quality of the reconstructed frame, while controlling sub-frame parameters. Afterwards, the video encoder 204 moves on the next frame and the process repeats. With this formulation, embodiments of the present disclosure may use any RL algorithm to optimize the cumulative reward over time.

Additionally, and/or alternatively, embodiments of the present disclosure may perform content-based video compression using RL for video rate control for a downstream task. For example, in lossy video encoding, the quality of the encoding may be quantified using a quality metric on the reconstruction error of each frame in the resulting video. However, in many usages of video data, no human watches the video and instead, an AI system uses the video as input for a downstream task such as outlier detection, gesture recognition, car detection, and so on.

Therefore, as described in further detail above, embodiments of the present disclosure may train an RL agent (e.g., the RL agent 212) that selects the frame's rate parameters in every frame. The RL agent may learn to increase the downstream task performance while keeping up with the desired bit-rate through a designed reward function. For instance, during inference, the RL agent (e.g., the RL agent 262) may consider the next frame in every time step that requires encoding. The RL agent's observation may be composed of frame statistics (e.g., the frame information 258), the input frame image (e.g., the frame from the video source 252), and/or features from the feature extractor (e.g., the feature extractor 260). The agent's policy may then be to map these observations to the action, which may be the vector of sub-frame rate parameters for every sub-frame in the frame. The frame may then be encoded using the video encoder (e.g., the video encoder 254), and the decoded reconstructed frame may also be generated as part of the process. This process repeats itself for every frame in the video and new statistics may be formed based on the encoding history and/or the policy that outputs a vector of sub-frame QPs that the encoder uses to encode the next frame.

Among other benefits and advantages, embodiments of the present disclosure provide an RL agent 212 that processes frame information 208 (e.g., QP information comprising an initial frame level QP value and/or an initial QP map), extracted features of a frame, and/or color space values of the frame to generate a sub-frame quantization parameter map 214 that includes a plurality of QP values. The sub-frame quantization parameter map 214 is used by the video encoder 204 to generate a bitstream 216. The plurality of QP values of the sub-frame quantization parameter may indicate a compression amount for each sub-block of the frame. Additionally, and/or alternatively, the RL agent 212 is trained using a reward associated with the pre-trained downstream model 220. For example, a raw frame from the video source 202 may be processed by the pre-trained downstream model 220 to generate a raw frame output. A reconstructed frame may further be processed by the pre-trained downstream model 220 to generate a reconstructed frame output. A reward may be determined based on comparing the reconstructed frame output and the raw frame output, and the reward may be used to train the RL agent 212.

FIG. 3A illustrates a flowchart of a method 300 for performing content-based video compression using reinforcement learning (RL) for sub-frame rate control, in accordance with one or more embodiments of the present disclosure. Each block of method 300, described herein, comprises a computing process that may be performed using any combination of hardware, firmware, and/or software.

For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the overviews 200 and/or 250. However, the method 300 may additionally or alternatively be executed by any one system, or any combination of systems, including, but not limited to, those described herein. Furthermore, persons of ordinary skill in the art will understand that any system that performs method 300 is within the scope and spirit of embodiments of the present disclosure.

At step 305, frame information associated with a frame from a video is obtained. The frame information comprises quantization parameter (QP) information associated with the frame. In an embodiment, the frame comprises a plurality of pixels, each of the plurality of MBs of the frame is associated with a block of pixels from the plurality of pixels of the frame, and each of the plurality of updated values is associated with an MB from the plurality of MBs and indicates a compression amount for the block of pixels of the MB. In an embodiment, the QP information comprises one or more initial QP frame values that indicates one or more initial compression levels for the plurality of MBs of the frame. In an embodiment, the QP information comprises an initial QP map indicating a plurality of initial values for the plurality of MBs of the frame, and each of the plurality of initial values is associated with an MB from the plurality of MBs and indicates an initial compression level for the associated MB.

At step 310, the frame information and additional information associated with the frame is processed using a reinforcement learning (RL) agent to generate a QP map indicating a plurality of updated values associated with a plurality of macro-blocks (MBs) of the frame. In an embodiment, the plurality of updated values of the generated QP map indicate a plurality of QP values, each of the plurality of QP values is associated with an MB from the plurality of MBs, and a first QP value of the plurality of QP values associated with a first MB from the plurality of MBs indicates a first number of bits from the bitstream to allocate to the first MB. In an embodiment, the plurality of updated values of the generated QP map indicate a plurality of delta values, each of the plurality of delta values is associated with an MB from the plurality of MBs, and a first delta value of the plurality of delta values associated with a first MB from the plurality of MBs indicates a difference between a QP value from the frame information and a QP value of the first MB that is output from the RL agent.

In an embodiment, the additional information associated with the frame comprises red, green, blue (RGB) pixel values associated with the frame, luma, blue projection, and red projection (YUV) pixel values associated with the frame, or image values associated with the frame, wherein the image values are hyperspectral image values or medical image values. In an embodiment, the frame information further comprises bit budgets, encoding parameters, and previous quality metric scores associated with a video encoder.

At step 315, a bitstream comprising a plurality of bits for the frame is generated based on the generated QP map. The plurality of updated values from the generated QP map indicates an amount of allocated bits from the bitstream to allocate for each of the plurality of MBs. In an embodiment, the amount of allocated bits may indicate a number of allocated bits from the bitstream to allocate for each of the plurality of MBs or a fraction of allocated bits from the bitstream to allocate for each of the plurality of MBs.

At step 320, the bitstream is provided to a downstream model. The downstream model performs one or more tasks based on a reconstructed video associated with the bitstream.

In an embodiment, obtaining the frame information associated with the frame comprises processing the frame using a video encoder to generate the frame information comprising the QP information, generating the bitstream comprising the plurality of bits for the frame comprises generating, by the video encoder, the bitstream based on the generated QP map that is provided by the RL agent, and providing the bitstream to the downstream model comprises providing, by the video encoder, the bitstream to a second system comprising a video decoder and the downstream model.

In an embodiment, the method 300 further comprises training the RL agent based on using a proximal policy optimization (PPO) algorithm, a soft actor critic (SAC) algorithm, or an advantage actor critic (A2C) algorithm.

In an embodiment, the method 300 further comprises processing the frame using a feature extractor to generate the additional information associated with the frame. The additional information comprises features of the frame.

In an embodiment, at least one of steps 310-320 and/or the further steps described above for method 300 are performed on a server or in a data center to generate the bitstream, and the bitstream is streamed to a user device. In an embodiment, at least one of steps 310-320 and/or the further steps described above for method 300 is performed within a cloud computing environment and/or within an edge device. In an embodiment, at least one of steps 310-320 and/or the further steps described above for method 300 is performed for training, testing, or certifying a neural network employed in a machine, robot, or autonomous vehicle. In an embodiment, at least one of steps 310-320 and/or the further steps described above for method 300 is performed on a virtual machine comprising a portion of a graphics processing unit.

FIG. 3B illustrates a flowchart of a method 350 for performing content-based video compression using reinforcement learning (RL) for video rate control for a downstream task, in accordance with one or more embodiments of the present disclosure. Each block of method 350, described herein, comprises a computing process that may be performed using any combination of hardware, firmware, and/or software. For instance, various functions may be carried out by a processor executing instructions stored in memory. The method 350 may also be embodied as computer-usable instructions stored on computer storage media. The method 350 may be provided by a standalone application, a service or hosted service (standalone or in combination with another hosted service), or a plug-in to another product, to name a few. In addition, method 350 is described, by way of example, with respect to the overviews 200 and/or 250. However, the method 350 may additionally or alternatively be executed by any one system, or any combination of systems, including, but not limited to, those described herein. Furthermore, persons of ordinary skill in the art will understand that any system that performs method 350 is within the scope and spirit of embodiments of the present disclosure.

At step 355, frame information associated with a raw frame from a video is processed using a reinforcement learning (RL) agent to generate quantization parameter (QP)

information that indicates one or more values associated with a compression level of the raw frame. In an embodiment, the one or more values of the generated QP information comprises a plurality of updated values associated with a plurality of macro-blocks (MBs) of the raw frame, the raw frame comprises a plurality of pixels, wherein each of the plurality of MBs of the raw frame is associated with a block of pixels from the plurality of pixels, and each of the plurality of updated values is associated with an MB from the plurality of MBs and indicates a compression amount for the block of pixels of the MB. In an embodiment, the plurality of updated values indicate a plurality of QP values, and wherein a first QP value of the plurality of QP values associated with a first MB from the plurality of MBs indicates a first amount of bits from the bitstream to allocate to the first MB. In an embodiment, the first amount of bits from the bitstream indicates a number of allocated bits from the bitstream to allocate to the first MB or a fraction of allocated bits from the bitstream to allocate to the first MB. In an embodiment, the plurality of updated values of the generated QP information indicate a plurality of delta values, and a first delta value of the plurality of delta values associated with a first MB from the plurality of MBs indicates a difference between a QP value of the raw frame and a QP value of the first MB. In an embodiment, processing the frame information using the RL agent to generate the QP information further comprises: processing the frame information and additional information using the RL agent to generate the QP information. The additional information comprises: red, green, blue (RGB) pixel values associated with the frame, luma, blue projection, and red projection (YUV) pixel values associated with the frame, or image values associated with the frame, wherein the image values are hyperspectral image values or medical image values.

In an embodiment, the QP information indicates a single QP value for the entire frame. In an embodiment, the QP information indicates a QP map of the entire frame, which allocates the QP for each sub-block (e.g., MB) in the frame. In an embodiment, the QP information indicates a delta QP map, which changes the QP for each sub-block of the frame according to a same baseline (e.g., initial) QP map or QP value. In an embodiment, the QP information indicates a subset of the QP map or the delta QP map. In an embodiment, the QP information indicates the single QP value for the entire frame and the delta QP map. In an embodiment, the QP information indicates the single QP value for the entire frame and the subset of the QP map or the delta QP map. In other words, as mentioned above, the RL agent may generate QP information such as by setting the QP of one entire frame, setting the QP map of one entire frame, setting the delta QP map, setting a subset of the QP map or the delta QP map, and/or any combination of the above.

At step 360, the raw frame is encoded into a bitstream comprising a plurality of bits based on the compression level indicated by the one or more values of the generated QP information.

At step 365, the raw frame is reconstructed using a pre-trained downstream model to generate a raw frame output.

At step 370, the raw frame is processed using a pretrained downstream model to generate a raw frame output.

At step 375, the reconstructed frame is processed using the pre-trained downstream model to generate a reconstructed frame output.

At step 380, a downstream task reward is determined based on comparing the raw frame output and the reconstructed frame output. In an embodiment, determining the downstream task reward is based on a task-specific loss function associated with the pre-trained downstream model.

At step 385, the RL agent is trained based on the downstream task reward.

In an embodiment, the downstream task is for object detection and segmentation, the raw frame output indicates bounding boxes for detected objects within the raw frame, and the reconstructed frame output indicates bounding boxes for detected objects within the reconstructed frame. In an embodiment, the RL agent uses a proximal policy optimization (PPO) algorithm.

In an embodiment, the method 350 further comprises determining a bit-rate reward based on a current average bit-rate associated with the bitstream and a target bit-rate for the downstream task, and training the RL agent is further based on the bit-rate reward. In an embodiment, training the RL agent comprises: computing an overall reward for the raw frame based on the bit-rate reward, the downstream task reward, and a hyper-parameter; and performing training of the RL agent using the overall reward, the frame information, and the generated QP information. In an embodiment, training the RL agent further comprises: storing the overall reward for the raw frame, the frame information for the raw frame, and the generated QP information of the raw frame in a data buffer; determining a second overall reward and a second generated QP information for a second frame from the video using the RL agent; and storing the second overall reward and the second generated QP information in the data buffer. Further, performing the training of the RL agent is further based on the second overall reward and the second generated QP information that are stored in the data buffer.

In an embodiment, at least one of steps 355-385 and/or the further steps described above for method 350 are performed on a server or in a data center to generate the bitstream, and the bitstream is streamed to a user device. In an embodiment, at least one of steps 355-385 and/or the further steps described above for method 350 is performed within a cloud computing environment and/or within an edge device. In an embodiment, at least one of steps 355-385 and/or the further steps described above for method 350 is performed for training, testing, or certifying a neural network employed in a machine, robot, or autonomous vehicle. In an embodiment, at least one of steps 355-385 and/or the further steps described above for method 350 is performed on a virtual machine comprising a portion of a graphics processing unit.

In some examples, embodiments of the present disclosure may be based on a machine learning (ML) approach that learns the policy that optimizes the rate parameter and may further continuously improve and adjust to new types of videos. Additionally, and/or alternatively, embodiments of the present disclosure may optimize a downstream task (e.g., maximizes the performance of one or more downstream tasks, depending on the application). Further, embodiments of the present disclosure might not use the outputs from the downstream task during inference, which allows the encoding to operate smoothly on edge devices. Additionally, and/or alternatively, embodiments of the present disclosure optimize rate control over the entire video or a group of frames in the video (e.g., using RL to optimize the long-term implication of parameter selections such that the entire video is optimized). Additionally, and/or alternatively, embodiments of the present disclosure may control the rate parameter of a standardized video encoder (e.g., any type of standard video encoder) based on using a frame specific rate parameter (e.g., QP) that has a specific usage in controlling the bit-rate quality trade-off. Additionally, and/or alternatively, embodiments of the present disclosure may control compression at the sub-frame level (e.g., learning to predict a rate parameter for every sub-frame block or for groups of blocks depending on the application). Additionally, and/or alternatively, embodiments of the present disclosure may be applied to a real-time setting and implementation (e.g., allowing for on-the-fly compression without needing to analyze the full video in advance).

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4:
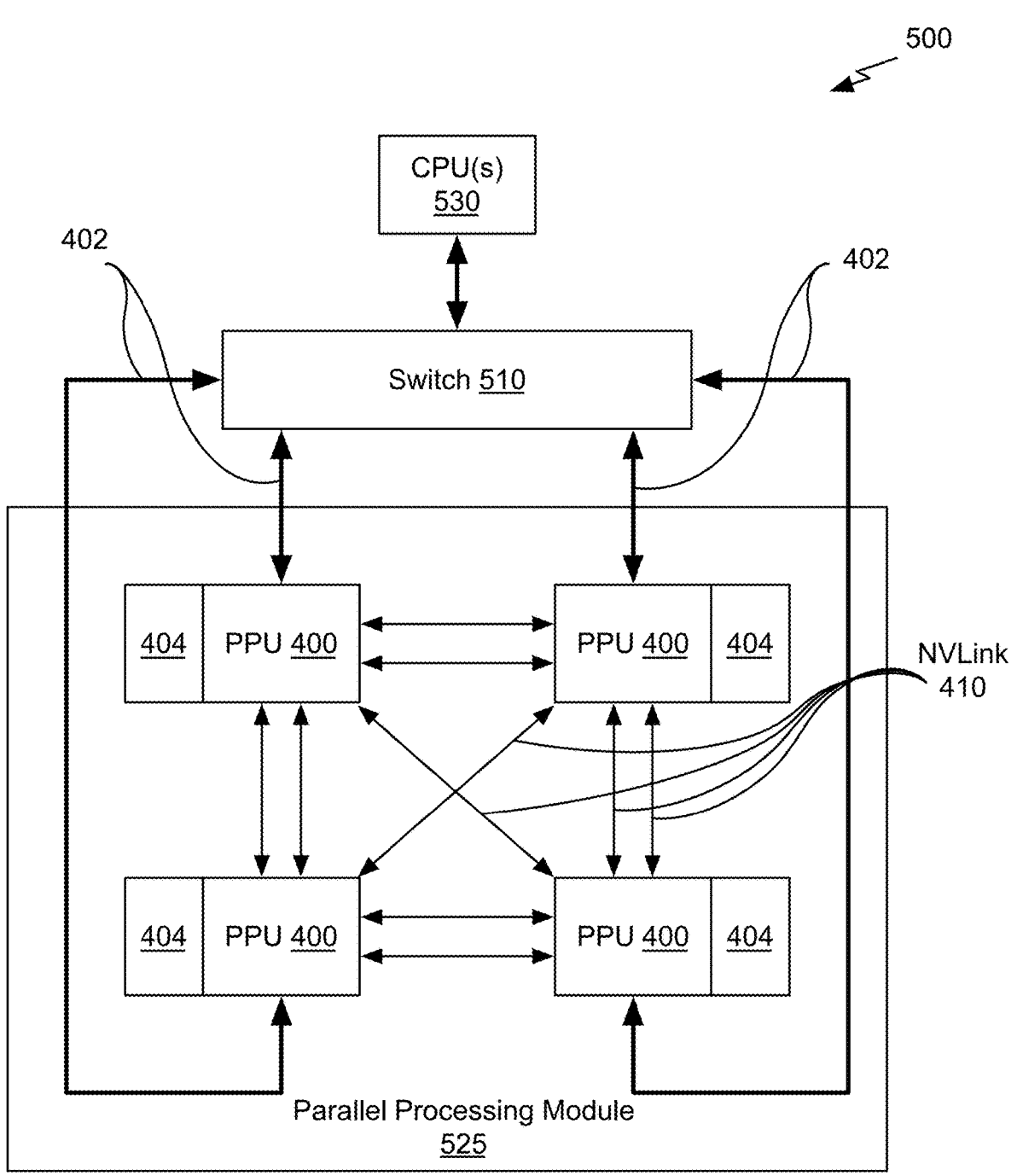
FIG. 4 is a conceptual diagram of a processing system implemented using a PPU, suitable for use in implementing some embodiments of the present disclosure.

FIG. 4 is a conceptual diagram of a processing system 500 implemented using multiple PPUs 400, in accordance with an embodiment. The exemplary system 500 may utilized as a particular node—or portion thereof—in the above-described multi-node computing systems. In addition to the multiple PPUs 400, the processing system 500 includes a CPU 530, switch 510, and respective memories 404 for the PPUs 400.

Each parallel processing unit (PPU) 400 may include hundreds or thousands of cores that are capable of handling hundreds or thousands of software threads simultaneously. The PPUs 400 may generate pixel data for output images in response to rendering commands (e.g., rendering commands from the CPU(s) 530 received via a host interface). The PPUs 400 may include graphics memory, such as display memory, for storing pixel data or any other suitable data, such as GPU data. The display memory may be included as part of the memory 404. The PPUs 400 may include two or more GPUs operating in parallel (e.g., via a link). The link may directly connect the GPUs (e.g., using NVLINK 410) or may connect the GPUs through a switch (e.g., using switch 510). When combined together, each PPU 400 may generate pixel data or GPGPU data for different portions of an output or for different outputs (e.g., a first PPU for a first image and a second PPU for a second image). Each PPU 400 may include its own memory 404, or may share memory with other PPUs 400.

The PPUs 400 may each include, and/or be configured to perform functions of, one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The NVLink 410 provides high-speed communication links between each of the PPUs 400. Although a particular number of NVLink 410 and interconnect 402 connections are illustrated in FIG. 4, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 4, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 4, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

Figure 5A:
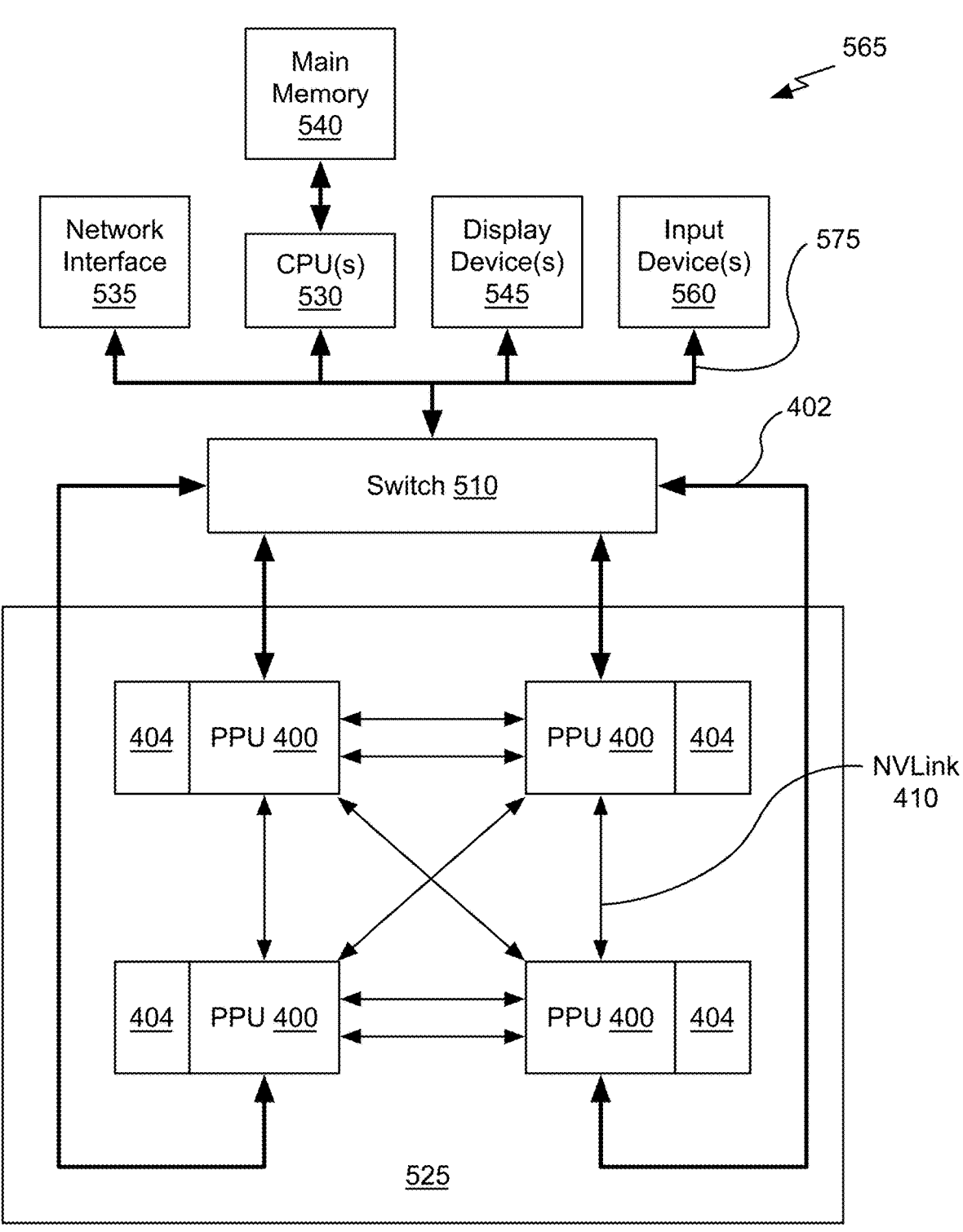
FIG. 5A illustrates an exemplary system in which the various architecture and/or functionality of the various previous embodiments may be implemented.

FIG. 5A illustrates an exemplary system 565 in which the various architecture and/or functionality of the various previous embodiments may be implemented. The exemplary system 565 may be configured to implement the method 300 shown in FIG. 3.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Although the various blocks of FIG. 5A are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5A is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5A.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an ×86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may be implemented as a network interface controller (NIC) that includes one or more data processing units (DPUs) to perform operations such as (for example and without limitation) packet parsing and accelerating network processing and communication. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 4 and/or exemplary system 565 of FIG. 5A—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 4 and/or exemplary system 565 of FIG. 5A. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron is the most basic model of a neural network. In one example, a neuron may receive one or more inputs that represent various features of an object that the neuron is being trained to recognize and classify, and each of these features is assigned a certain weight based on the importance of that feature in defining the shape of an object.

A deep neural network (DNN) model includes multiple layers of many connected nodes (e.g., neurons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

Figure 5B:
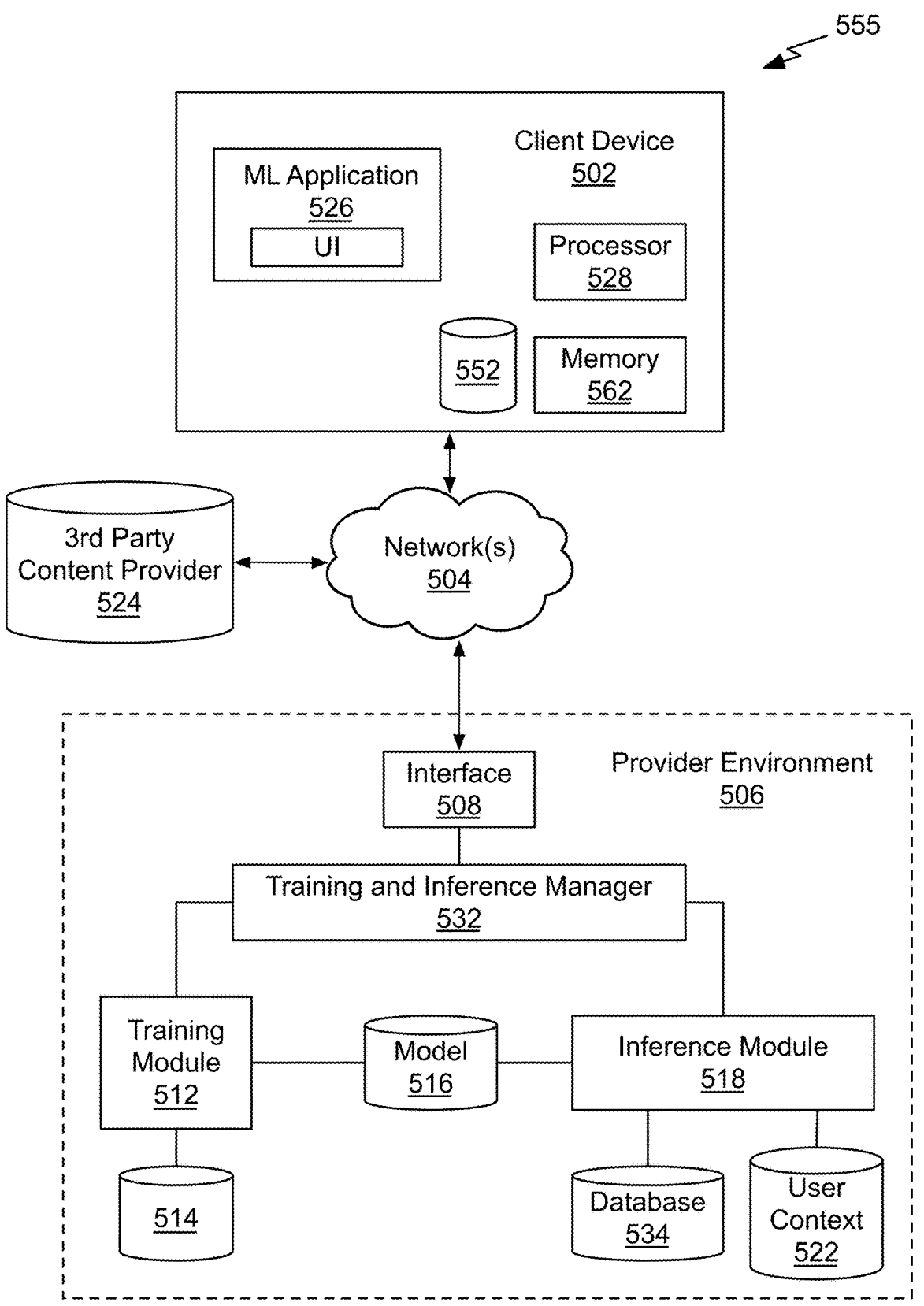
FIG. 5B illustrates components of an exemplary system that can be used to train and utilize machine learning, in at least one embodiment.

FIG. 5B illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 400 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506. In at least one embodiment, supervised and/or unsupervised training can be performed by the client device 502 and/or the provider environment 506. In at least one embodiment, a set of training data 514 (e.g., classified or labeled data) is provided as input to function as training data.

In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA Geforce Now (GFN), Google Stadia, and the like.

Example Streaming System

Figure 6:
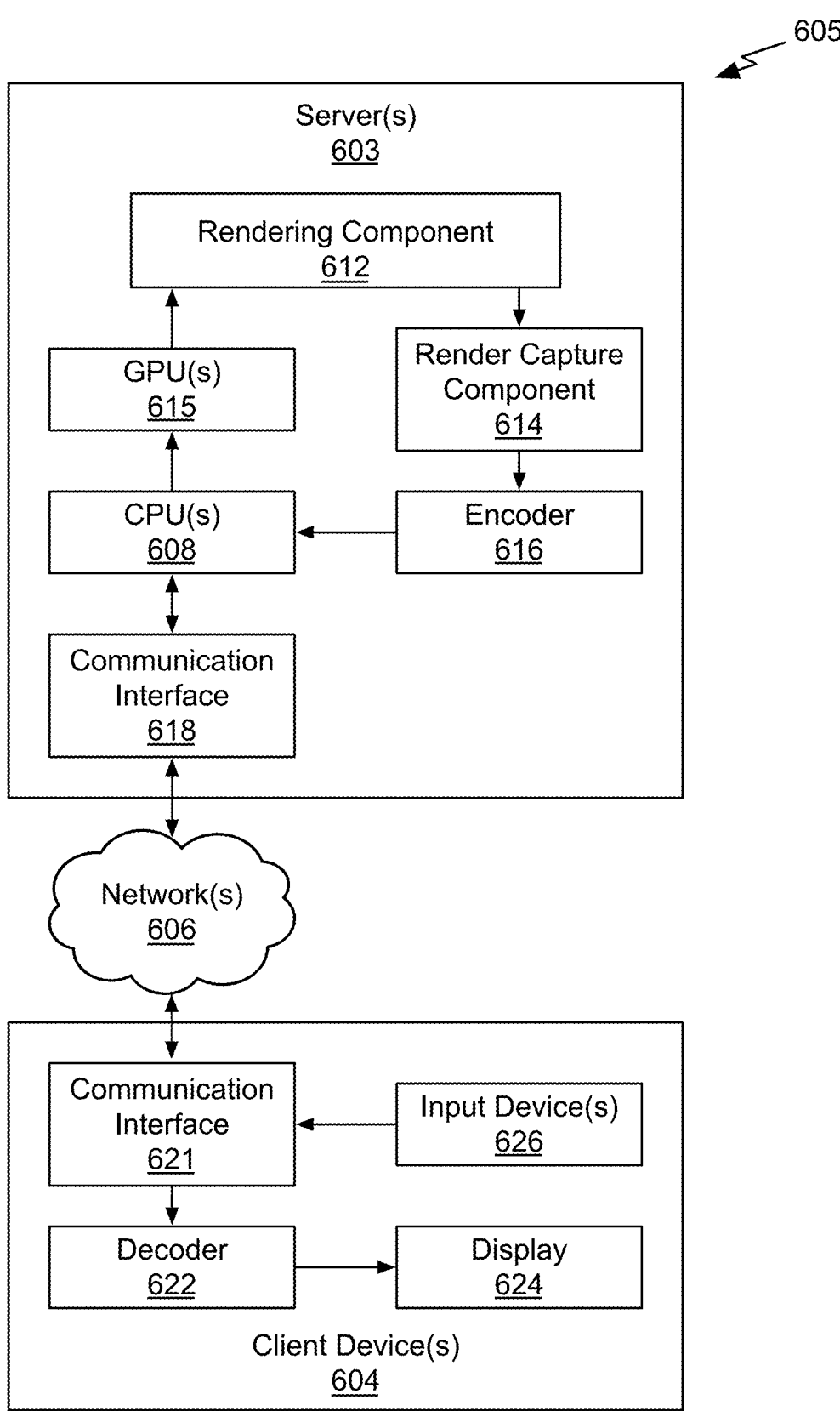
FIG. 6 illustrates an exemplary streaming system suitable for use in implementing some embodiments of the present disclosure.

FIG. 6 is an example system diagram for a streaming system 605, in accordance with some embodiments of the present disclosure. FIG. 6 includes server(s) 603 (which may include similar components, features, and/or functionality to the example processing system 500 of FIG. 4 and/or exemplary system 565 of FIG. 5A), client device(s) 604 (which may include similar components, features, and/or functionality to the example processing system 500 of FIG. 4 and/or exemplary system 565 of FIG. 5A), and network(s) 606 (which may be similar to the network(s) described herein). In some embodiments of the present disclosure, the system 605 may be implemented.

In an embodiment, the streaming system 605 is a game streaming system and the server(s) 603 are game server(s). In the system 605, for a game session, the client device(s)

604 may only receive input data in response to inputs to the input device(s) 626, transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) 615 of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) 626 and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) 608 may receive the input data, process the input data, and transmit data to the GPU(s) 615 that causes the GPU(s) 615 to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units-such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

The arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. Various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for performing content-based video compression using reinforcement learning (RL) for sub-frame rate control, comprising:

obtaining frame information associated with a frame from a video, wherein the frame information comprises quantization parameter (QP) information associated with the frame;

processing the frame information and additional information associated with the frame using an RL agent to generate a QP map indicating a plurality of updated values associated with a plurality of macro-blocks (MBs) of the frame;

generating a bitstream comprising a plurality of bits for the frame based on the generated QP map, wherein the plurality of updated values from the generated QP map indicates an amount of allocated bits from the bitstream to allocate for each of the plurality of MBs; and providing the bitstream to a downstream model, wherein the downstream model performs one or more tasks based on a reconstructed video associated with the bitstream.

2. The computer-implemented method of claim 1, wherein the frame comprises a plurality of pixels, wherein each of the plurality of MBs of the frame is associated with a block of pixels from the plurality of pixels of the frame, and wherein each of the plurality of updated values is associated with an MB from the plurality of MBs and indicates a compression amount for the block of pixels of the MB.

3. The computer-implemented method of claim 1, wherein the plurality of updated values of the generated QP map indicate a plurality of QP values, wherein each of the plurality of QP values is associated with an MB from the plurality of MBs, and wherein a first QP value of the plurality of QP values associated with a first MB from the plurality of MBs indicates a first number of bits from the bitstream to allocate to the first MB.

4. The computer-implemented method of claim 1, wherein the plurality of updated values of the generated QP map indicate a plurality of delta values, wherein each of the plurality of delta values is associated with an MB from the plurality of MBs, and wherein a first delta value of the plurality of delta values associated with a first MB from the plurality of MBs indicates a difference between a QP value from the frame information and a QP value of the first MB that is output from the RL agent.

5. The computer-implemented method of claim 1, further comprising:

processing the frame using a feature extractor to generate the additional information associated with the frame, wherein the additional information comprises features of the frame.

6. The computer-implemented method of claim 1, wherein the additional information associated with the frame comprises:

red, green, blue (RGB) pixel values associated with the frame, luma, blue projection, and red projection (YUV) pixel values associated with the frame, or image values associated with the frame, wherein the image values are hyperspectral image values or medical image values.

7. The computer-implemented method of claim 1, wherein the frame information further comprises bit budgets, encoding parameters, and previous quality metric scores associated with a video encoder.

8. The computer-implemented method of claim 1, wherein obtaining the frame information associated with the frame comprises processing the frame using a video encoder to generate the frame information comprising the QP information, wherein generating the bitstream comprising the plurality of bits for the frame comprises generating, by the video encoder, the bitstream based on the generated QP map that is provided by the RL agent, and wherein providing the bitstream to the downstream model comprises providing, by the video encoder, the bitstream to a second system comprising a video decoder and the downstream model.

9. The computer-implemented method of claim 1, further comprising:

training the RL agent based on using a proximal policy optimization (PPO) algorithm, a soft actor critic (SAC) algorithm, or an advantage actor critic (A2C) algorithm.

10. The computer-implemented method of claim 1, wherein the QP information comprises one or more initial QP frame values that indicates one or more initial compression levels for the plurality of MBs of the frame.

11. The computer-implemented method of claim 1, wherein the amount of allocated bits indicate a number of allocated bits from the bitstream to allocate for each of the plurality of MBs or a fraction of allocated bits from the bitstream to allocate for each of the plurality of MBs.

12. The computer-implemented method of claim 1, wherein at least one of the steps of obtaining, processing, generating, and providing are performed on a server or in a data center to generate the bitstream, and the bitstream is provided to a user device.

13. The computer-implemented method of claim 1, wherein at least one of the steps of obtaining, processing, generating, and providing are performed within a cloud computing environment and/or within an edge device.

14. The computer-implemented method of claim 1, wherein at least one of the steps of obtaining, processing, generating, and providing are performed for training, testing, or certifying a neural network employed in a machine, robot, or autonomous vehicle.

15. The computer-implemented method of claim 1, wherein at least one of the steps of obtaining, processing, generating, and providing are performed on a virtual machine comprising a portion of a graphics processing unit.

16. A system for performing content-based video compression using reinforcement learning (RL) for sub-frame rate control, comprising:

one or more processors; and
a non-transitory computer-readable medium having processor-executable instructions stored thereon, wherein the processor-executable instructions, when executed by the one or more processors, facilitate:

obtaining frame information associated with a frame from a video, wherein the frame information comprises quantization parameter (QP) information associated with the frame;

processing the frame information and additional information associated with the frame using an RL agent to generate a QP map indicating a plurality of updated values associated with a plurality of macro-blocks (MBs) of the frame;

generating a bitstream comprising a plurality of bits for the frame based on the generated QP map, wherein the plurality of updated values from the generated QP map indicates an amount of allocated bits from the bitstream to allocate for each of the plurality of MBs; and providing the bitstream to a downstream model, wherein the downstream model performs one or more tasks based on a reconstructed video associated with the bitstream.

17. The system of claim 16, wherein the frame comprises a plurality of pixels, wherein each of the plurality of MBs of the frame is associated with a block of pixels from the plurality of pixels of the frame, and wherein each of the plurality of updated values is associated with an MB from the plurality of MBs and indicates a compression amount for the block of pixels of the MB.

18. The system of claim 16, wherein the plurality of updated values of the generated QP map indicate a plurality of QP values, wherein each of the plurality of QP values is associated with an MB from the plurality of MBs, and wherein a first QP value of the plurality of QP values associated with a first MB from the plurality of MBs indicates a first number of bits from the bitstream to allocate to the first MB.

19. A non-transitory computer-readable medium having processor-executable instructions stored thereon for performing content-based video compression using reinforcement learning (RL) for sub-frame rate control, wherein the processor-executable instructions, when executed, facilitate:

obtaining frame information associated with a frame from a video, wherein the frame information comprises quantization parameter (QP) information associated with the frame;

processing the frame information and additional information associated with the frame using an RL agent to generate a QP map indicating a plurality of updated values associated with a plurality of macro-blocks (MBs) of the frame;

generating a bitstream comprising a plurality of bits for the frame based on the generated QP map, wherein the plurality of updated values from the generated QP map indicates an amount of allocated bits from the bitstream to allocate for each of the plurality of MBs; and providing the bitstream to a downstream model, wherein the downstream model performs one or more tasks based on a reconstructed video associated with the bitstream.

20. The non-transitory computer-readable medium of claim 19, wherein the frame comprises a plurality of pixels, wherein each of the plurality of MBs of the frame is associated with a block of pixels from the plurality of pixels of the frame, and wherein each of the plurality of updated values is associated with an MB from the plurality of MBs and indicates a compression amount for the block of pixels of the MB.

* * * * *